(12) United States Patent
Sherrard et al.

(10) Patent No.: US 10,969,932 B2
(45) Date of Patent: *Apr. 6, 2021

(54) PREFERRED CONTACT GROUP CENTRIC INTERFACE

(71) Applicant: T-Mobile USA Inc., Bellevue, WA (US)

(72) Inventors: Andrew Sherrard, Seattle, WA (US); Warren McNeel, Issaquah, WA (US); Jasdeep Singh Chugh, Renton, WA (US); Stephen John O'Connor, London (GB); Mikkel Crone Koser, London (GB); Richard Paul Turnnidge, Pinner (GB); Michael Thomas Hendrick, Renton, WA (US); Gary Sentman, Furlong, PA (US); Karl Warfel, Covington, WA (US); Wen-Hsing Chang, Issaquah, WA (US); Sally Abolrous, Issaquah, WA (US); Adrian Buzescu, Bellevue, WA (US)

(73) Assignee: T-Moblle USA, Inc., Bellevue, WA (US)

( * ) Notice: Subject to any disclaimer, the term of this patent is extended or adjusted under 35 U.S.C. 154(b) by 292 days.

This patent is subject to a terminal disclaimer.

(21) Appl. No.: 14/617,826

(22) Filed: Feb. 9, 2015

(65) Prior Publication Data

US 2015/0220220 A1     Aug. 6, 2015

Related U.S. Application Data

(63) Continuation of application No. 14/089,259, filed on Nov. 25, 2013, now Pat. No. 8,954,891, which is a
(Continued)

(51) Int. Cl.
G06F 3/0482     (2013.01)
G06F 16/28     (2019.01)
(Continued)

(52) U.S. Cl.
CPC .......... G06F 3/0482 (2013.01); G06F 3/0481 (2013.01); G06F 3/04817 (2013.01);
(Continued)

(58) Field of Classification Search
CPC .... G06F 3/0481; G06F 3/0482; G06F 16/285; G06F 3/04817; H04M 1/72519;
(Continued)

(56) References Cited

U.S. PATENT DOCUMENTS 4,723,209 A     2/1988   Hernandez et al.
D296,218 S      6/1988   Wells-Papanek et al.
(Continued)

FOREIGN PATENT DOCUMENTS

DE     10155431 A1    6/2003
EP     0767418 A1     4/1997
(Continued)

OTHER PUBLICATIONS

International Search Report (PCT/US2010/028905)., dated Nov. 12, 2010.
(Continued)

*Primary Examiner* — Ryan F Pitaro
(74) *Attorney, Agent, or Firm* — Knobbe, Martens, Olson & Bear, LLP

(57) ABSTRACT

A preferred contact group centric interface for a communication device can be used to facilitate communications by a user. The user interface can be arranged to activate from a user's "home page" on the display, from an idle screen that is accessed after a timeout period expires, or any other appropriate mechanism that activates the preferred contact group centric experience. A user selects the preferred contact group from among an array of the user's contacts. Once the contact group is configured, a minimal number of navigation/selection features is necessary to activate any number of
(Continued)

communication modes available to the contacts. The contact group is configured such that simple and quick navigation between the contact members is achieved. The contact group can be presented in 2D and 3D arrangements, in any number of list or geometric configurations. A pricing plan can optionally be tied to each member of the contact group.

14 Claims, 29 Drawing Sheets

Related U.S. Application Data continuation of application No. 12/492,267, filed on Jun. 26, 2009, now Pat. No. 8,595,649, which is a continuation of application No. 11/400,925, filed on Apr. 10, 2006, now Pat. No. 7,685,530.

(60) Provisional application No. 60/689,581, filed on Jun. 10, 2005.

(51) Int. Cl.
| | |
|---|---|
| *G06F 3/0481* | (2013.01) |
| *G06Q 30/02* | (2012.01) |
| *H04M 1/27475* | (2020.01) |
| *H04M 1/725* | (2021.01) |
| *H04M 3/42* | (2006.01) |
| *H04M 15/00* | (2006.01) |
| *H04W 4/16* | (2009.01) |
| *H04W 8/18* | (2009.01) |
| *H04M 1/27* | (2006.01) |

(52) U.S. Cl.
CPC ....... *G06F 16/285* (2019.01); *G06Q 30/0283* (2013.01); *H04M 1/27* (2013.01); *H04M 1/27475* (2020.01); *H04M 1/72563* (2013.01); *H04M 1/72566* (2013.01); *H04M 1/72577* (2013.01); *H04M 3/42068* (2013.01); *H04M 15/8066* (2013.01); *H04W 4/16* (2013.01); *H04W 8/183* (2013.01)

(58) Field of Classification Search
CPC ......... H04M 3/42068; H04M 1/27475; H04M 1/27; H04M 15/8066; H04M 1/72577; H04M 1/72566; H04M 1/72563; H04W 8/183; H04W 4/16; G06Q 30/0283
See application file for complete search history.

(56) References Cited

U.S. PATENT DOCUMENTS

| | | | |
|---|---|---|---|
| 5,590,256 | A | 12/1996 | Tchao et al. |
| 5,617,539 | A * | 4/1997 | Ludwig ................. G06Q 10/10 348/14.03 |
| D384,052 | S | 9/1997 | Kodosky |
| D388,424 | S | 12/1997 | DeMuro et al. |
| D391,948 | S | 3/1998 | Eisenberg |
| 5,724,531 | A | 3/1998 | Miyashita et al. |
| 5,751,980 | A | 5/1998 | Musashi et al. |
| D395,427 | S | 6/1998 | Arora et al. |
| 5,793,365 | A | 8/1998 | Tang et al. |
| 5,796,394 | A * | 8/1998 | Wicks ................. H04M 1/6505 709/206 |
| D397,687 | S | 9/1998 | Arora et al. |
| D398,595 | S | 9/1998 | Baer et al. |
| 5,822,123 | A | 10/1998 | Davis et al. |
| 5,867,226 | A | 2/1999 | Wehmeyer et al. |
| 5,880,733 | A | 3/1999 | Horvitz et al. |
| 5,889,517 | A | 3/1999 | Ueda et al. |
| D415,483 | S | 10/1999 | Decker |
| 5,987,107 | A | 11/1999 | Brown |
| 5,987,469 | A | 11/1999 | Lewis et al. |
| 6,006,200 | A | 12/1999 | Boies et al. |
| 6,023,275 | A | 2/2000 | Horvitz et al. |
| 6,047,233 | A | 4/2000 | Salvatore, Jr. et al. |
| D424,036 | S | 5/2000 | Arora et al. |
| D424,541 | S | 5/2000 | Mugura |
| 6,104,398 | A | 8/2000 | Cox, Jr. et al. |
| 6,130,726 | A | 10/2000 | Darbee et al. |
| 6,144,863 | A | 11/2000 | Charron |
| 6,151,059 | A | 11/2000 | Schein et al. |
| D437,858 | S | 2/2001 | Yasui et al. |
| 6,188,406 | B1 | 2/2001 | Fong et al. |
| D438,873 | S | 3/2001 | Wang et al. |
| 6,201,957 | B1 | 3/2001 | Son et al. |
| D440,979 | S | 4/2001 | Wang et al. |
| 6,222,921 | B1 | 4/2001 | Mugura et al. |
| 6,226,367 | B1 | 5/2001 | Smith et al. |
| 6,236,398 | B1 | 5/2001 | Kojima et al. |
| 6,249,863 | B1 | 6/2001 | Redford et al. |
| D445,426 | S | 7/2001 | Wang et al. |
| D446,790 | S | 8/2001 | Wang et al. |
| 6,313,877 | B1 | 11/2001 | Anderson |
| 6,332,024 | B1 | 12/2001 | Inoue et al. |
| D454,138 | S | 3/2002 | Imamura et al. |
| D454,139 | S | 3/2002 | Feldcamp |
| 6,359,635 | B1 | 3/2002 | Perttunen |
| 6,393,430 | B1 | 5/2002 | Van Ryzin |
| D459,361 | S | 6/2002 | Inagaki |
| D463,444 | S | 9/2002 | Istvan et al. |
| 6,460,181 | B1 | 10/2002 | Donnelly |
| 6,466,237 | B1 | 10/2002 | Miyao et al. |
| 6,486,870 | B1 | 11/2002 | Kozu |
| D467,252 | S | 12/2002 | Lee |
| D469,442 | S | 1/2003 | Bohlen, Jr. et al. |
| D470,857 | S | 2/2003 | Anderson et al. |
| D471,226 | S | 3/2003 | Gray |
| 6,532,459 | B1 | 3/2003 | Berson |
| 6,538,635 | B1 | 3/2003 | Ringot |
| D472,902 | S | 4/2003 | Nashida et al. |
| D473,236 | S | 4/2003 | Robbin et al. |
| D474,198 | S | 5/2003 | Barnes |
| D474,778 | S | 5/2003 | Barnes |
| D475,064 | S | 5/2003 | Nashida et al. |
| 6,563,515 | B1 | 5/2003 | Reynolds et al. |
| 6,577,330 | B1 | 6/2003 | Tsuda et al. |
| 6,600,936 | B1 | 7/2003 | Karkkainen et al. |
| D478,912 | S | 8/2003 | Johnson |
| D485,279 | S | 1/2004 | DeCombe |
| 6,678,891 | B1 | 1/2004 | Wilcox et al. |
| D486,499 | S | 2/2004 | Hayashi et al. |
| 6,741,268 | B1 | 5/2004 | Hayakawa |
| 6,757,365 | B1 | 6/2004 | Bogard |
| D495,339 | S | 8/2004 | Gildred |
| 6,775,659 | B2 | 8/2004 | Clifton-Bligh |
| 6,781,575 | B1 * | 8/2004 | Hawkins ........... H04M 1/27455 345/169 |
| D495,715 | S | 9/2004 | Gildred |
| 6,788,987 | B2 | 9/2004 | Slechta et al. |
| 6,801,849 | B2 | 10/2004 | Szukala et al. |
| 6,845,153 | B2 | 1/2005 | Tiburtius et al. |
| 6,850,255 | B2 | 2/2005 | Muschetto |
| 6,865,404 | B1 | 3/2005 | Tikkala et al. |
| D506,474 | S | 6/2005 | Gildred |
| 6,907,575 | B2 | 6/2005 | Duarte |
| D507,577 | S | 7/2005 | Totten et al. |
| 6,925,650 | B1 | 8/2005 | Arsenault et al. |
| D510,581 | S | 10/2005 | Robbin et al. |
| 6,959,207 | B2 | 10/2005 | Keinonen et al. |
| 6,968,179 | B1 | 11/2005 | De Vries |
| 6,975,712 | B1 | 12/2005 | Schnarel et al. |
| 6,978,473 | B1 | 12/2005 | Nsonwu et al. |
| 7,007,239 | B1 * | 2/2006 | Hawkins ............. H04M 1/0254 379/93.23 |
| 7,036,091 | B1 | 4/2006 | Nguyen et al. |
| 7,046,993 | B2 | 5/2006 | Haaramo et al. |
| D523,439 | S | 6/2006 | Kuroda |
| D523,440 | S | 6/2006 | Hernandez et al. |
| D523,868 | S | 6/2006 | Kuroda |
| 7,076,546 | B1 | 7/2006 | Bates et al. |

(56) References Cited

U.S. PATENT DOCUMENTS

| | | |
|---|---|---|
| 7,083,109 B2 | 8/2006 | Pouchak |
| 7,086,008 B2 | 8/2006 | Capps et al. |
| 7,089,287 B2 | 8/2006 | Bellotti et al. |
| 7,099,862 B2 | 8/2006 | Fitzpatrick et al. |
| D528,556 S | 9/2006 | Decombre |
| 7,111,788 B2 | 9/2006 | Reponen |
| 7,117,445 B2 | 10/2006 | Berger |
| 7,137,073 B2 | 11/2006 | Kim et al. |
| 7,167,910 B2 | 1/2007 | Farnham et al. |
| 7,174,516 B2* | 2/2007 | Chipchase .......... H04M 1/2745 345/440 |
| 7,178,109 B2 | 2/2007 | Hewson et al. |
| 7,187,761 B2 | 3/2007 | Bookstaff |
| D540,340 S | 4/2007 | Cummins |
| D543,986 S | 6/2007 | Rimas-Ribikauskas et al. |
| D543,987 S | 6/2007 | Rimas-Ribikauskas et al. |
| D543,992 S | 6/2007 | Vigesaa |
| D544,875 S | 6/2007 | Wang et al. |
| D544,877 S | 6/2007 | Sasser |
| D545,324 S | 6/2007 | Decombe |
| 7,231,229 B1 | 6/2007 | Hawkins et al. |
| 7,236,576 B2 | 6/2007 | Schnarel et al. |
| 7,236,780 B2 | 6/2007 | Benco et al. |
| D545,827 S | 7/2007 | Evans et al. |
| D545,832 S | 7/2007 | Armendariz |
| D546,342 S | 7/2007 | Armendariz |
| D547,321 S | 7/2007 | Viegers et al. |
| 7,248,677 B2 | 7/2007 | Randall et al. |
| 7,248,857 B1 | 7/2007 | Richardson et al. |
| D548,239 S | 8/2007 | Rimas-Ribikauskas et al. |
| D548,743 S | 8/2007 | Takahashi et al. |
| D550,681 S | 9/2007 | Totten et al. |
| D551,252 S | 9/2007 | Andre et al. |
| D552,114 S | 10/2007 | Tolle et al. |
| D554,142 S | 10/2007 | Cameron |
| 7,280,652 B2 | 10/2007 | Bocking et al. |
| D554,652 S | 11/2007 | Shen et al. |
| D556,765 S | 12/2007 | Evans et al. |
| D557,268 S | 12/2007 | Fletcher |
| D558,221 S | 12/2007 | Nagata et al. |
| D562,343 S | 2/2008 | Fletcher |
| 7,330,845 B2 | 2/2008 | Lee et al. |
| D563,972 S | 3/2008 | Sherry |
| 7,343,365 B2 | 3/2008 | Farmham et al. |
| 7,343,565 B2 | 3/2008 | Ying et al. |
| D565,586 S | 4/2008 | Shin et al. |
| D565,627 S | 4/2008 | Kase |
| D567,251 S | 4/2008 | Sadler |
| D567,817 S | 4/2008 | Kwag et al. |
| 7,353,034 B2 | 4/2008 | Haney |
| 7,360,174 B2 | 4/2008 | Grossman et al. |
| D568,334 S | 5/2008 | Okaro et al. |
| D568,897 S | 5/2008 | Byeon |
| D568,898 S | 5/2008 | Byeon |
| D568,899 S | 5/2008 | Byeon |
| D569,387 S | 5/2008 | Byeon |
| 7,369,850 B2 | 5/2008 | Andrew et al. |
| D570,369 S | 6/2008 | Fletcher |
| D571,819 S | 6/2008 | Scott et al. |
| D573,601 S | 7/2008 | Gregov et al. |
| D574,392 S | 8/2008 | Kwag et al. |
| D575,297 S | 8/2008 | Glezer et al. |
| D575,298 S | 8/2008 | Chen et al. |
| D575,792 S | 8/2008 | Benson |
| D576,174 S | 9/2008 | Ording et al. |
| D577,364 S | 9/2008 | Flynt et al. |
| D578,134 S | 10/2008 | Jasinski |
| D578,543 S | 10/2008 | Ulm et al. |
| 7,437,005 B2 | 10/2008 | Drucker et al. |
| 7,440,910 B1 | 10/2008 | Ruvolo et al. |
| 7,444,342 B1 | 10/2008 | Hall et al. |
| D580,450 S | 11/2008 | Chen et al. |
| D580,946 S | 11/2008 | Chen et al. |
| 7,450,927 B1 | 11/2008 | Creswell et al. |
| D582,426 S | 12/2008 | Chen et al. |
| D582,928 S | 12/2008 | Blankenship et al. |
| D583,823 S | 12/2008 | Chen et al. |
| D584,737 S | 1/2009 | Stone et al. |
| D585,453 S | 1/2009 | Chen et al. |
| D585,454 S | 1/2009 | Ismail |
| D586,361 S | 2/2009 | Horowitz et al. |
| D586,362 S | 2/2009 | Horowitz et al. |
| 7,490,295 B2 | 2/2009 | Chaudhri et al. |
| D588,148 S | 3/2009 | Stone et al. |
| D588,149 S | 3/2009 | Brownell et al. |
| D588,150 S | 3/2009 | Stone et al. |
| 7,503,014 B2 | 3/2009 | Tojo et al. |
| 7,506,246 B2 | 3/2009 | Hollander |
| 7,512,652 B1 | 3/2009 | Appelman et al. |
| 7,512,655 B2 | 3/2009 | Armstrong et al. |
| D589,970 S | 4/2009 | Bhat et al. |
| D590,407 S | 4/2009 | Watanabe et al. |
| D590,412 S | 4/2009 | Saft et al. |
| 7,519,912 B2 | 4/2009 | Moody et al. |
| 7,526,306 B2 | 4/2009 | Brems et al. |
| D592,218 S | 5/2009 | Blankenship et al. |
| D592,674 S | 5/2009 | Kwag |
| D593,120 S | 5/2009 | Bouchard et al. |
| 7,536,654 B2 | 5/2009 | Anthony et al. |
| D593,574 S | 6/2009 | Guimaraes et al. |
| D593,576 S | 6/2009 | Ball et al. |
| D594,015 S | 6/2009 | Singh et al. |
| D594,465 S | 6/2009 | Hong et al. |
| D594,872 S | 6/2009 | Akimoto |
| 7,543,245 B2 | 6/2009 | Irimajiri |
| 7,546,543 B2 | 6/2009 | Louch et al. |
| 7,555,727 B2* | 6/2009 | Hawkins ............. H04M 1/0254 379/93.23 |
| D596,192 S | 7/2009 | Shotel |
| 7,562,304 B2 | 7/2009 | Dixon et al. |
| 7,577,700 B2 | 8/2009 | Tolson et al. |
| 7,580,363 B2 | 8/2009 | Sorvari et al. |
| D599,368 S | 9/2009 | Kanga et al. |
| D599,806 S | 9/2009 | Brown et al. |
| D599,807 S | 9/2009 | Marashi |
| D599,810 S | 9/2009 | Scalisi et al. |
| D599,811 S | 9/2009 | Watanabe et al. |
| D599,812 S | 9/2009 | Hirsch |
| D599,813 S | 9/2009 | Hirsch |
| D599,814 S | 9/2009 | Ogura et al. |
| D601,153 S | 9/2009 | Setiawan et al. |
| 7,587,215 B2 | 9/2009 | Chakraborty et al. |
| 7,587,683 B2 | 9/2009 | Ito et al. |
| D602,038 S | 10/2009 | Channell et al. |
| 7,603,628 B2 | 10/2009 | Park et al. |
| D603,415 S | 11/2009 | Lin et al. |
| D603,416 S | 11/2009 | Poling et al. |
| D603,418 S | 11/2009 | Magnani et al. |
| D603,420 S | 11/2009 | Channell |
| D603,867 S | 11/2009 | La et al. |
| D604,310 S | 11/2009 | Ahn |
| D604,316 S | 11/2009 | Hoefnagels et al. |
| D604,317 S | 11/2009 | Hoefnagels et al. |
| D604,740 S | 11/2009 | Matheny et al. |
| 7,620,996 B2 | 11/2009 | Torres et al. |
| D605,200 S | 12/2009 | Sakai |
| D605,652 S | 12/2009 | Plaisted et al. |
| D605,653 S | 12/2009 | Danton |
| D606,088 S | 12/2009 | Yokouchi et al. |
| D606,550 S | 12/2009 | La et al. |
| D607,002 S | 12/2009 | Jonasson et al. |
| 7,636,889 B2 | 12/2009 | Weber et al. |
| D608,364 S | 1/2010 | Walsh et al. |
| D608,366 S | 1/2010 | Matas |
| D608,367 S | 1/2010 | Scalisi et al. |
| D608,368 S | 1/2010 | Bamford |
| 7,646,745 B2 | 1/2010 | Caldwell et al. |
| 7,650,361 B1 | 1/2010 | Wong et al. |
| D609,714 S | 2/2010 | Oda et al. |
| D609,715 S | 2/2010 | Chaudhri |
| D610,159 S | 2/2010 | Matheny et al. |
| D610,161 S | 2/2010 | Matas |
| 7,665,028 B2 | 2/2010 | Cummins et al. |
| 7,665,033 B2 | 2/2010 | Byrne et al. |

(56) References Cited

U.S. PATENT DOCUMENTS

| | | | |
|---|---|---|---|
| D611,056 S | 3/2010 | Langlois et al. | |
| D611,484 S | 3/2010 | Mays et al. | |
| D611,485 S | 3/2010 | Marashi | |
| D611,489 S | 3/2010 | Bell et al. | |
| D611,490 S | 3/2010 | Lee et al. | |
| D612,860 S | 3/2010 | Tarara et al. | |
| D615,549 S | 3/2010 | Caine et al. | |
| 7,673,017 B2 | 3/2010 | Kim et al. | |
| 7,685,530 B2 | 3/2010 | Sherrard et al. | |
| D613,300 S | 4/2010 | Chaudhri | |
| D613,747 S | 4/2010 | Jonasson et al. | |
| D614,191 S | 4/2010 | Takano et al. | |
| D614,192 S | 4/2010 | Takano et al. | |
| D614,633 S | 4/2010 | Watanabe et al. | |
| D614,643 S | 4/2010 | Viegers et al. | |
| D614,646 S | 4/2010 | Chen et al. | |
| 7,702,543 B2 | 4/2010 | MacKay et al. | |
| 7,703,031 B2 | 4/2010 | Nakagawa et al. | |
| 7,705,833 B2 | 4/2010 | Kim | |
| D612,394 S | 5/2010 | La et al. | |
| D615,090 S | 5/2010 | Sogabe | |
| D615,546 S | 5/2010 | Lundy et al. | |
| 7,720,498 B2 | 5/2010 | Lee | |
| D617,804 S | 6/2010 | Hirsch | |
| D617,805 S | 6/2010 | Scalisi et al. | |
| D618,250 S | 6/2010 | Stallings et al. | |
| 7,685,520 B2 | 6/2010 | Rashkovskiy et al. | |
| 7,735,021 B2 * | 6/2010 | Padawer | H04M 1/27455 715/810 |
| 7,738,912 B1 | 6/2010 | Hawkins et al. | |
| D619,593 S | 7/2010 | Fujioka et al. | |
| D619,594 S | 7/2010 | Jonasson et al. | |
| D620,948 S | 8/2010 | Scalisi et al. | |
| D621,844 S | 8/2010 | Van Os | |
| D621,845 S | 8/2010 | Anzures et al. | |
| D622,280 S | 8/2010 | Tarara | |
| 7,779,358 B1 | 8/2010 | Gupta et al. | |
| D624,556 S | 9/2010 | Chaudhri | |
| 7,797,641 B2 | 9/2010 | Karukka et al. | |
| D625,325 S | 10/2010 | Vu et al. | |
| D626,136 S | 10/2010 | Fujimura | |
| D627,790 S | 11/2010 | Chaudhri | |
| D628,206 S | 11/2010 | Lemay | |
| 7,831,675 B2 | 11/2010 | Narayanaswami et al. | |
| 7,898,600 B2 | 3/2011 | Lee et al. | |
| 7,900,139 B2 | 3/2011 | Hosotsubo | |
| D638,025 S | 5/2011 | Saft et al. | |
| 7,971,222 B2 | 6/2011 | Ellis | |
| 8,015,187 B2 | 9/2011 | Choi et al. | |
| 8,046,801 B2 | 10/2011 | Ellis et al. | |
| D652,843 S | 1/2012 | van Os | |
| 8,631,351 B2 | 1/2014 | Fong et al. | |
| 8,671,355 B2 | 3/2014 | Pegg et al. | |
| 8,893,025 B2 | 11/2014 | Vance et al. | |
| 9,160,828 B2 | 10/2015 | Vance et al. | |
| 9,195,966 B2 | 11/2015 | Vance et al. | |
| 9,210,247 B2 | 12/2015 | Vance et al. | |
| 9,274,680 B2 | 3/2016 | Morillon et al. | |
| 9,304,659 B2 | 4/2016 | Sherrard et al. | |
| 9,355,382 B2 | 5/2016 | Vance et al. | |
| 9,363,378 B1 * | 6/2016 | McDaniel | H04M 3/533 |
| 9,396,542 B2 | 6/2016 | Vance et al. | |
| 9,886,487 B2 | 2/2018 | Vance et al. | |
| 10,021,231 B2 | 7/2018 | Vance et al. | |
| 10,177,990 B2 | 1/2019 | Vance et al. | |
| 10,178,519 B2 | 1/2019 | Vance et al. | |
| 10,191,623 B2 | 1/2019 | Vance et al. | |
| 10,510,008 B2 | 12/2019 | Vance et al. | |
| 10,733,642 B2 | 8/2020 | Benson et al. | |
| 10,771,605 B2 | 9/2020 | Vance et al. | |
| 2001/0044743 A1 | 11/2001 | McKinley et al. | |
| 2001/0046886 A1 | 11/2001 | Ishigaki | |
| 2002/0045960 A1 | 4/2002 | Phillips et al. | |
| 2002/0052754 A1 | 5/2002 | Joyce et al. | |
| 2002/0054164 A1 | 5/2002 | Uemura | |
| 2002/0059201 A1 | 5/2002 | Work | |
| 2002/0145623 A1 | 10/2002 | DeCombe | |
| 2003/0009439 A1 | 1/2003 | Lee | |
| 2003/0014179 A1 | 1/2003 | Szukala et al. | |
| 2003/0030670 A1 * | 2/2003 | Duarte | G06Q 10/10 715/758 |
| 2003/0034878 A1 * | 2/2003 | Hull | H04M 1/22 340/5.61 |
| 2003/0078033 A1 | 4/2003 | Sauer et al. | |
| 2003/0164818 A1 | 9/2003 | Miller-Smith et al. | |
| 2003/0210265 A1 * | 11/2003 | Haimberg | H04L 51/04 715/758 |
| 2003/0224816 A1 | 12/2003 | Kundaje et al. | |
| 2003/0225879 A1 | 12/2003 | Chipchase | |
| 2004/0017376 A1 | 1/2004 | Tagliabue et al. | |
| 2004/0041836 A1 * | 3/2004 | Zaner | G06Q 10/10 715/751 |
| 2004/0046796 A1 | 3/2004 | Fujita | |
| 2004/0067751 A1 | 4/2004 | Vandermeijden | |
| 2004/0073643 A1 * | 4/2004 | Hayes | G06Q 10/107 709/223 |
| 2004/0075691 A1 * | 4/2004 | Moon | H04M 1/72547 715/805 |
| 2004/0076444 A1 | 4/2004 | Badovinac et al. | |
| 2004/0077340 A1 | 4/2004 | Forsyth | |
| 2004/0091093 A1 | 5/2004 | Bookstaff | |
| 2004/0100479 A1 | 5/2004 | Nakano et al. | |
| 2004/0102225 A1 | 5/2004 | Furuta et al. | |
| 2004/0113927 A1 | 6/2004 | Quinn et al. | |
| 2004/0119755 A1 * | 6/2004 | Guibourge | G06F 3/0482 715/827 |
| 2004/0119758 A1 * | 6/2004 | Grossman | G06Q 10/109 715/839 |
| 2004/0122683 A1 | 6/2004 | Grossman et al. | |
| 2004/0122684 A1 | 6/2004 | Kaikuranta | |
| 2004/0133638 A1 | 7/2004 | Doss et al. | |
| 2004/0155908 A1 * | 8/2004 | Wagner | G06F 3/04817 715/854 |
| 2004/0162812 A1 | 8/2004 | Lane | |
| 2004/0172455 A1 * | 9/2004 | Green | G06Q 10/107 709/207 |
| 2004/0185890 A1 | 9/2004 | Drozt et al. | |
| 2004/0221239 A1 | 11/2004 | Hachigian et al. | |
| 2004/0235520 A1 | 11/2004 | Cadiz et al. | |
| 2004/0236749 A1 | 11/2004 | Cortright et al. | |
| 2004/0237048 A1 | 11/2004 | Tojo et al. | |
| 2004/0239982 A1 | 12/2004 | Gignac | |
| 2004/0250217 A1 | 12/2004 | Tojo et al. | |
| 2004/0268228 A1 | 12/2004 | Croney et al. | |
| 2004/0268265 A1 * | 12/2004 | Berger | G06F 1/1622 715/752 |
| 2005/0005235 A1 | 1/2005 | Satterfield et al. | |
| 2005/0010584 A1 * | 1/2005 | Reponen | H04M 1/2747 |
| 2005/0010876 A1 | 1/2005 | Robertson et al. | |
| 2005/0033603 A1 | 2/2005 | Suzuki et al. | |
| 2005/0033698 A1 | 2/2005 | Chapman | |
| 2005/0038856 A1 | 2/2005 | Krishnasamy et al. | |
| 2005/0039140 A1 | 2/2005 | Chen | |
| 2005/0041011 A1 | 2/2005 | Silfverberg et al. | |
| 2005/0059418 A1 | 3/2005 | Northcutt | |
| 2005/0060377 A1 * | 3/2005 | Lo | G06Q 30/02 709/206 |
| 2005/0071780 A1 | 3/2005 | Muller et al. | |
| 2005/0079863 A1 | 4/2005 | Macaluso | |
| 2005/0080859 A1 | 4/2005 | Lake | |
| 2005/0086611 A1 | 4/2005 | Takabe et al. | |
| 2005/0091272 A1 | 4/2005 | Smith et al. | |
| 2005/0094205 A1 | 5/2005 | Lo et al. | |
| 2005/0114374 A1 | 5/2005 | Juszkiewicz et al. | |
| 2005/0118996 A1 | 6/2005 | Lee et al. | |
| 2005/0120306 A1 * | 6/2005 | Klassen | G06F 3/0482 715/765 |
| 2005/0138574 A1 | 6/2005 | Lin | |
| 2005/0143135 A1 | 6/2005 | Brems et al. | |
| 2005/0143138 A1 | 6/2005 | Lee et al. | |
| 2005/0160376 A1 | 7/2005 | Sciammarella et al. | |
| 2005/0163290 A1 | 7/2005 | Gilles et al. | |
| 2005/0172001 A1 | 8/2005 | Zaner et al. | |

(56) References Cited

U.S. PATENT DOCUMENTS

| | | |
|---|---|---|
| 2005/0182837 A1 | 8/2005 | Harris et al. |
| 2005/0188312 A1* | 8/2005 | Bocking .............. G06F 3/0484 715/739 |
| 2005/0209994 A1 | 9/2005 | Noro et al. |
| 2005/0210104 A1 | 9/2005 | Torvinen |
| 2005/0221807 A1 | 10/2005 | Karlsson et al. |
| 2005/0229110 A1 | 10/2005 | Gegner et al. |
| 2005/0235225 A1 | 10/2005 | Pradhan et al. |
| 2005/0235226 A1 | 10/2005 | Watanabe et al. |
| 2005/0235251 A1 | 10/2005 | Arend et al. |
| 2005/0243979 A1 | 11/2005 | Starbuck et al. |
| 2005/0245236 A1 | 11/2005 | Servi et al. |
| 2005/0246654 A1 | 11/2005 | Nally et al. |
| 2005/0261011 A1 | 11/2005 | Scott |
| 2005/0261032 A1 | 11/2005 | Seo et al. |
| 2005/0262186 A1* | 11/2005 | Szeto .............. G06Q 10/107 709/203 |
| 2005/0262204 A1* | 11/2005 | Szeto .............. G06Q 30/06 709/206 |
| 2005/0268237 A1* | 12/2005 | Crane .............. G06F 3/0481 715/732 |
| 2005/0278652 A1 | 12/2005 | Scholz |
| 2006/0009249 A1 | 1/2006 | Fu et al. |
| 2006/0010395 A1 | 1/2006 | Aaltonen |
| 2006/0030347 A1 | 2/2006 | Biswaas |
| 2006/0048076 A1 | 3/2006 | Vronay et al. |
| 2006/0053379 A1 | 3/2006 | Henderson et al. |
| 2006/0055700 A1 | 3/2006 | Niles et al. |
| 2006/0058010 A1 | 3/2006 | Williams et al. |
| 2006/0084410 A1 | 4/2006 | Sutaria et al. |
| 2006/0094404 A1* | 5/2006 | Burgess .............. G06F 1/3209 455/412.1 |
| 2006/0101350 A1* | 5/2006 | Scott .............. G06F 3/0481 715/779 |
| 2006/0112354 A1 | 5/2006 | Park et al. |
| 2006/0123660 A1 | 6/2006 | Anwar et al. |
| 2006/0140015 A1 | 6/2006 | Kasamsetty |
| 2006/0141996 A1 | 6/2006 | Huh |
| 2006/0143574 A1 | 6/2006 | Ito et al. |
| 2006/0146765 A1 | 7/2006 | Van De Sluis et al. |
| 2006/0148499 A1 | 7/2006 | Chie |
| 2006/0148522 A1 | 7/2006 | Chipchase et al. |
| 2006/0161868 A1 | 7/2006 | Van Dok et al. |
| 2006/0168539 A1 | 7/2006 | Hawkins et al. |
| 2006/0170945 A1* | 8/2006 | Bill .............. G06F 17/30749 358/1.13 |
| 2006/0174121 A1 | 8/2006 | Omae et al. |
| 2006/0174269 A1 | 8/2006 | Hansen-Turton |
| 2006/0212829 A1 | 9/2006 | Yahiro et al. |
| 2006/0223518 A1 | 10/2006 | Haney |
| 2006/0224675 A1 | 10/2006 | Fox et al. |
| 2006/0242581 A1 | 10/2006 | Manion et al. |
| 2006/0242597 A1 | 10/2006 | Park |
| 2006/0253787 A1* | 11/2006 | Fogg .............. G06F 3/0481 715/752 |
| 2006/0277488 A1 | 12/2006 | Cok et al. |
| 2006/0293057 A1 | 12/2006 | Mazerski et al. |
| 2007/0011617 A1 | 1/2007 | Akagawa et al. |
| 2007/0026645 A1 | 2/2007 | Lieber et al. |
| 2007/0027920 A1 | 2/2007 | Alvarado et al. |
| 2007/0032267 A1 | 2/2007 | Haitani et al. |
| 2007/0033540 A1 | 2/2007 | Bridges et al. |
| 2007/0037561 A1 | 2/2007 | Bowen et al. |
| 2007/0043688 A1 | 2/2007 | Kountz et al. |
| 2007/0060206 A1* | 3/2007 | Dam Nielsen .... H04M 1/27455 455/566 |
| 2007/0067738 A1 | 3/2007 | Flynt et al. |
| 2007/0072586 A1 | 3/2007 | Morhenn et al. |
| 2007/0073874 A1 | 3/2007 | Moghaddam et al. |
| 2007/0079246 A1 | 4/2007 | Morillon et al. |
| 2007/0118813 A1 | 5/2007 | Forstall et al. |
| 2007/0129112 A1 | 6/2007 | Tarn |
| 2007/0135103 A1 | 6/2007 | Middleton |
| 2007/0136360 A1 | 6/2007 | Randall et al. |
| 2007/0136687 A1 | 6/2007 | Pak |
| 2007/0150830 A1* | 6/2007 | Ording .............. G06F 3/0481 715/784 |
| 2007/0162862 A1 | 7/2007 | Ogasawara et al. |
| 2007/0164989 A1 | 7/2007 | Rochford et al. |
| 2007/0168262 A1 | 7/2007 | Morotomi et al. |
| 2007/0174389 A1 | 7/2007 | Armstrong et al. |
| 2007/0198947 A1 | 8/2007 | Cox et al. |
| 2007/0226645 A1 | 9/2007 | Kongqiao et al. |
| 2007/0250822 A1 | 10/2007 | Yang et al. |
| 2007/0250936 A1 | 10/2007 | Nakamura et al. |
| 2007/0268908 A1 | 11/2007 | Linkola et al. |
| 2007/0271528 A1 | 11/2007 | Park et al. |
| 2008/0014982 A1* | 1/2008 | Foxenland .......... G06Q 10/107 455/550.1 |
| 2008/0022228 A1 | 1/2008 | Kwon et al. |
| 2008/0034317 A1 | 2/2008 | Fard et al. |
| 2008/0059570 A1 | 3/2008 | Bill |
| 2008/0081653 A1 | 4/2008 | Mock et al. |
| 2008/0086703 A1 | 4/2008 | Flynt et al. |
| 2008/0098311 A1 | 4/2008 | Delarue et al. |
| 2008/0111826 A1 | 5/2008 | Endrikhovski et al. |
| 2008/0122870 A1 | 5/2008 | Brodersen et al. |
| 2008/0158189 A1 | 7/2008 | Kim |
| 2008/0172030 A1 | 7/2008 | Blomquist |
| 2008/0189614 A1 | 8/2008 | Jeong et al. |
| 2008/0189627 A1 | 8/2008 | Nikitin et al. |
| 2008/0194934 A1 | 8/2008 | Ray et al. |
| 2008/0215978 A1 | 9/2008 | Bamba |
| 2008/0220751 A1* | 9/2008 | De Bast .............. G06F 3/0338 455/414.2 |
| 2008/0220752 A1 | 9/2008 | Forstall et al. |
| 2008/0235248 A1 | 9/2008 | Krantz et al. |
| 2008/0256170 A1 | 10/2008 | Hayashi et al. |
| 2008/0261569 A1* | 10/2008 | Britt .............. G06Q 10/107 455/414.1 |
| 2008/0263069 A1 | 10/2008 | Harris et al. |
| 2008/0280600 A1 | 11/2008 | Zhou |
| 2008/0282158 A1 | 11/2008 | Aaltonen et al. |
| 2008/0288612 A1 | 11/2008 | Kwon |
| 2008/0288880 A1 | 11/2008 | Reponen et al. |
| 2009/0013048 A1* | 1/2009 | Partaker .............. G06Q 10/107 709/206 |
| 2009/0040875 A1 | 2/2009 | Buzescu et al. |
| 2009/0043847 A1 | 2/2009 | Laurila |
| 2009/0055484 A1* | 2/2009 | Vuong .............. G06Q 10/107 709/206 |
| 2009/0077496 A1 | 3/2009 | Aravamudan et al. |
| 2009/0100363 A1 | 4/2009 | Pegg et al. |
| 2009/0158200 A1 | 6/2009 | Palahnuk et al. |
| 2009/0164923 A1 | 6/2009 | Ovi |
| 2009/0187630 A1 | 7/2009 | Narayanaswami et al. |
| 2009/0193512 A1 | 7/2009 | Buckley et al. |
| 2009/0199120 A1 | 8/2009 | Baxter et al. |
| 2009/0228513 A1 | 9/2009 | Tian |
| 2009/0300518 A1 | 12/2009 | Mock et al. |
| 2009/0303188 A1 | 12/2009 | Triplett |
| 2010/0004008 A1 | 1/2010 | Abolrous et al. |
| 2010/0005520 A1 | 1/2010 | Abbot et al. |
| 2010/0020953 A1 | 1/2010 | Lidstrom et al. |
| 2010/0050123 A1 | 2/2010 | Sherrard et al. |
| 2010/0062753 A1 | 3/2010 | Wen et al. |
| 2010/0064231 A1 | 3/2010 | Gupta |
| 2010/0094837 A1 | 4/2010 | O'Sullivan et al. |
| 2010/0095009 A1 | 4/2010 | Matuszewski et al. |
| 2010/0144331 A1 | 6/2010 | Koberg et al. |
| 2010/0153886 A1 | 6/2010 | Hautala |
| 2010/0180001 A1 | 7/2010 | Hardt |
| 2010/0190467 A1 | 7/2010 | Scott et al. |
| 2010/0190468 A1 | 7/2010 | Scott et al. |
| 2010/0241544 A1 | 9/2010 | Benson et al. |
| 2010/0245262 A1 | 9/2010 | Vance et al. |
| 2010/0248701 A1 | 9/2010 | Vance et al. |
| 2010/0250606 A1 | 9/2010 | Vance et al. |
| 2010/0287504 A1 | 11/2010 | Vance et al. |
| 2010/0333029 A1 | 12/2010 | Smith et al. |
| 2011/0029892 A1 | 2/2011 | Kurtz et al. |
| 2011/0258547 A1 | 10/2011 | Symons et al. |
| 2011/0276571 A1 | 11/2011 | Yamada et al. |

(56) References Cited

U.S. PATENT DOCUMENTS

| | | |
|---|---|---|
| 2012/0071244 A1 | 3/2012 | Gillo et al. |
| 2013/0014021 A1 | 1/2013 | Bau et al. |
| 2013/0019173 A1 | 1/2013 | Kotler et al. |
| 2013/0019203 A1 | 1/2013 | Kotler et al. |
| 2013/0024780 A1 | 1/2013 | Sutedja et al. |
| 2013/0027335 A1 | 1/2013 | Li et al. |
| 2013/0275897 A1 | 10/2013 | Vance et al. |
| 2013/0281161 A1 | 10/2013 | Vance et al. |
| 2013/0283180 A1 | 10/2013 | Vance et al. |
| 2014/0033071 A1 | 1/2014 | Gruber et al. |
| 2014/0220942 A1 | 8/2014 | Vance et al. |
| 2015/0072644 A1 | 3/2015 | Sherrard et al. |
| 2016/0078097 A1 | 3/2016 | Vance et al. |
| 2017/0116532 A1 | 4/2017 | Vance et al. |
| 2017/0124175 A1 | 5/2017 | Vance et al. |
| 2017/0339079 A1 | 11/2017 | Appelman et al. |
| 2018/0295223 A1 | 10/2018 | Vance et al. |
| 2019/0116471 A1 | 4/2019 | Vance et al. |
| 2020/0167673 A1 | 5/2020 | Vance et al. |
| 2020/0322472 A1 | 10/2020 | Vance et al. |

FOREIGN PATENT DOCUMENTS

| | | | |
|---|---|---|---|
| EP | 1246434 A1 | 10/2002 | |
| EP | 1469374 A1 * | 10/2004 | ........... G06F 3/0482 |
| EP | 1482758 A1 | 12/2004 | |
| EP | 1571808 A1 | 9/2005 | |
| EP | 1608190 A1 | 12/2005 | |
| JP | 07-129363 A | 5/1995 | |
| JP | 08-123658 A | 5/1996 | |
| JP | 09-083630 A | 3/1997 | |
| JP | 09-311661 A | 12/1997 | |
| JP | H11-088496 A | 3/1999 | |
| JP | H11-327741 A | 11/1999 | |
| JP | 2000-259304 A | 9/2000 | |
| JP | 2000-348058 A | 12/2000 | |
| JP | 2002-009899 A | 1/2002 | |
| JP | 2003-198705 A | 7/2003 | |
| JP | 2004-208217 A | 7/2004 | |
| JP | 2004-348601 A | 12/2004 | |
| JP | 2005-072958 A | 3/2005 | |
| JP | 3834039 B2 | 10/2006 | |
| KR | 10-2002-0069964 A | 9/2002 | |
| KR | 10-2004-0024967 A | 3/2004 | |
| KR | 10-2005-0043148 A | 5/2005 | |
| KR | 10-2006-0042808 A | 5/2006 | |
| KR | 10-2007-0029009 A | 3/2007 | |
| KR | 10-2008-0004127 A | 1/2008 | |
| KR | 10-2008-0019614 A | 3/2008 | |
| KR | 10-2008-0079716 A | 9/2008 | |
| WO | WO 00/25501 A1 | 5/2000 | |
| WO | WO 03/044756 A1 | 5/2003 | |
| WO | WO 03/062976 A1 | 7/2003 | |
| WO | WO 2005/045799 A1 | 5/2005 | |
| WO | WO 2005/064441 A1 | 7/2005 | |
| WO | WO 2005/120112 A1 | 12/2005 | |
| WO | WO 2006/016227 A2 | 2/2006 | |
| WO | WO 2006/067567 A1 | 6/2006 | |
| WO | WO 2007/093997 A1 | 8/2007 | |
| WO | WO 2007/143678 A2 | 12/2007 | |
| WO | WO 2008/030776 A2 | 3/2008 | |
| WO | WO 2010/111610 | 9/2010 | |
| WO | WO 2010/111614 | 9/2010 | |
| WO | WO 2010/111637 | 9/2010 | |
| WO | WO 2010/111642 | 9/2010 | |
| WO | WO 2010/111643 | 9/2010 | |
| WO | WO 2010/111670 | 9/2010 | |
| WO | WO 2010/111675 | 9/2010 | |
| WO | WO 2010/111679 | 9/2010 | |

OTHER PUBLICATIONS

Alltel Corp at Lehman Brothers Worldwide Wireless, Wirelein, and Media Conference, Fair Disclosure Wire, May 22, 2006.

Alltel Launches 'My Circle,' a One-of-a-Kind Program That Gives Customers Free Calls to Any Network or Number They Choose, Business Wire, Apr. 20, 2006, pp. 1, New York.

Alltel's 'My Circle' Plan Lets Subscribers Adds 10 Numbers for Unlimited Calls, Wireless News, Apr. 23, 2006, pp. 2, Coventry.

Belson, K., Alltel to Offer Free-Calling Plan, With Limits, New York Times, Apr. 21, 2006, pp. C9, New York.

Boy Genius, LG Xenon hitting AT&T Before Christmas?, http://www.boygeniusreport.com/2008/09/24/lg-xenon-hitting-att-before-christmas/, Sep. 24, 2008, pp. 1.

Cuneo, A. Z., Alltel Gets Aggressive in Telecom War, Advertising Age, Chicago (Midwest region edition), Apr. 24, 2006, vol. 77, Issue 17, pp. 8.

European Search Report issued in connection with PCT/US2006022645., dated Sep. 6, 2011.

First Office Action in European Application No. 07812026.8 dated Jul. 17, 2012.

International Preliminary Report on Patentability in application No. PCT/2010/028863 dated Sep. 27, 2011.

International Preliminary Report on Patentability in application No. PCT/US/2010/028904 dated Sep. 27, 2011.

International Preliminary Report on Patentability in application No. PCT/US2010/028857 dated Sep. 27, 2011.

International Preliminary Report on Patentability in application No. PCT/US2010/028894 dated Sep. 27, 2011.

International Preliminary Report on Patentability in application No. PCT/US2010/028905 dated Sep. 27, 2011.

International Preliminary Report on Patentability in application No. PCT/US2010/028947 dated Sep. 27, 2011.

International Preliminary Report on Patentability in application No. PCT/US2010/028954 dated Sep. 27, 2011.

International Preliminary Report on Patentability in application No. PCT/US2010/028960 dated Sep. 27, 2011.

International Search Report (PCT/US2007070475)., dated Jun. 29, 2011.

International Search Report (PCT/US2010/028894)., dated Nov. 12, 2010.

International Search Report (PCT/US2010/028947)., dated Nov. 12, 2010.

International Search Report (PCT/US2010/028954)., dated Oct. 27, 2010.

International Search Report (PCT/US2010/028960)., dated Oct. 26, 2010.

International Search Report issued in connection with PCT/US2010/028857., dated Oct. 11, 2010.

International Search Report issued in connection with PCT/US2010/028863., dated Oct. 22, 2010.

International Search Report issued in connection with PCT/US2010/028904., dated Nov. 8, 2010.

Larson, V., Alltel's free wireless calling plan paying off, Knight Rider Tribune Business News, May 2005, pp. 2.

LG Xenon User Guide, AT&T, Apr. 8, 2009, pp. 146.

MobileCom Provides All Residential Pay As You Go Subscribers the Ability to Talk for 1 Piaster Per Minute Day and Night, www.albawaba.com, Mar. 14, 2006.

Office Action in Canadian Application No. 2588250 dated Aug. 23, 2013.

Office Action in Canadian Application No. 2657240 dated Sep. 3, 2013.

Office Action in R.O.C. Application No. 098304597 dated Dec. 15, 2011, in 4 pages.

Second Office Action in Chinese Application No. 200680020479.9 dated Mar. 22, 2012.

Sellers, P., MCI Communications Yes, Brands Can Still Work Magic, www.money.cnn.com, Feb. 7, 1994.

Weisser, C., et al., What do you pay to stay connected?, Money Magazine, http://money.cnn.com/2003/11/20/pf/portability_strategy_0312/index.htm, Nov. 24, 2003.

Office Action in Indian Application No. 10055/DELNP/2007 dated Jun. 8, 2018.

* cited by examiner

| FIG. 16A-1 | FIG. 16A-2 | FIG. 16A-3 |

FIG. 16A

Return to T-Mobile.com ▲ Not your phone? ▲ Tour My T-Mobile

My·T··Mobile.

| PHOTO HERE | PHOTO HERE |

Hello: John Doe
555_555_5555
▲ MY PROFILE ▲ Log out
Support for Samsung T609

BILLING | PLAN & SERVICES | PHONE & ACCESSORIES | DOWNLOADS | COMMUNICATION TOOLS | ASK T-MOBILE | SEARCH

BILLING

Current balance due
$0.00 ▲ PAY NOW

▲ See billing details
▲ Change billing preferences

Minutes used as of 12/22/05 8:05 AM
WHENEVER   600 MINUTES/MONTH
WEEKNIGHT   MINUTES/MONTH UNLIMITED
WEEKEND   MINUTES/MONTH UNLIMITED Minutes used information is also available by dialing #MIN# (#646#)

GET THE LATEST t-zones—a cool new way to shop

Give your phone personality with custom content and services. Get t-zones on your phone or check Communications Tools and Downloads below for new categories. Browsing is free and it's fun to check back for the latest updates. Extend your fun. Express your personality.

*FIG. 16A-1*

PLAN & SERVICES

- Group Contacts Plan
- Unlimited Weekend Minutes
- 400 Text Messages

▲ CHANGE PLAN OR SERVICES

GRAPHIC IMAGE HERE

GRAPHIC IMAGE HERE

PERSONAL COVERAGE CHECK

Check coverage where you work, live and play.

GRAPHIC IMAGE HERE  ▲ CHECK COVERAGE

PERSONALIZED SUPPORT

? Information tailored to your phone, plan, and service

▲ GET SUPPORT

Group Contacts

PHOTO HERE  PHOTO HERE  PHOTO HERE  PHOTO HERE  PHOTO HERE

5

Group Contact Plan

Free Calls to people that matter most to you!

LEARN MORE ABOUT GROUP CONTACTS

View the Group Contacts Demo

COMMUNICATION TOOLS & DOWNLOADS

@t zones | YOUR PHONE | YOUR WAY

On your phone or on the Web, t-zones lets you add fun and features any way, any time.

✉ MESSAGING

♪ MUSIC & SOUNDS    GRAPHIC IMAGE HERE

▲ RINGTONES
Tones for every mood, or every day.
Boulevard of Broken Dreams
Green Day Mega Tones
Green Day HiFi Ringers ▲ SEND A TEXT MESSAGE
▲ HOW TO USE VOICEMAIL
▲ SET UP MY E-MAIL
▲ MY ALBUM
Send, share, and view picture messages

*FIG. 16A-2*

▲ SET ALERTS
Categories include headlines, weather, lottery results, sent straight to your phone.

WEB & APPLICATIONS

▲ T-MOBILEWEB
Search the mobile web, find places to go get news, weather, sports, online games, email, community chat and more anywhere you go.
▲ Learn about T-MobileWeb
▲ Sign up for T-MobileWeb
▲ Upgrade your phone online

GRAPHIC IMAGE HERE

▲ CALLERTUNES<sup>SM</sup>
Customize what people hear when they call you.
▲ Learn more Already using Caller Tunes?
▲ Log in now

GRAPHIC IMAGE HERE

WALLPAPER

▲ WALL PAPER
Redecorate your phone
Winnie the Pooh
More Disney wallpaper
Top wallpaper downloads

GRAPHIC IMAGE HERE

GAMES

▲ Your current phone does not support downloadable Games. Visit one of our stores to upgrade your phone to one that can receive Games!

▲ Find a T-Mobile Store

Store Locator|Support|Contact Us|Coverage|Refer a Friend
T-Mobile.com: About T-Mobile USA|©2002-2005 T-Mobile USA, Inc.|Terms of Use|Terms & Conditions|Return Policy|Private Policy

*FIG. 16A-3*

| FIG. 16B-1 | FIG. 16B-2 | FIG. 16B-3 |

FIG. 16B

Return to T-Mobile.com  ▲ Not your phone?  ▲ Tour My T-Mobile

My·T··Mobile··

| PHOTO HERE | PHOTO HERE | Hello: John Doe<br>555_555_5555<br>▲ MY PROFILE  ▲ Log out<br>Support for Samsung T609 |

BILLING | PLAN & SERVICES | PHONE & ACCESSORIES | DOWNLOADS | COMMUNICATION TOOLS | ASK T-MOBILE | SEARCH

BILLING

Current balance due
$0.00  ▲ PAY NOW

▲ See billing details
▲ Change billing preferences

Minutes used as of 12/22/05 8:05 AM
WHENEVER      600 MINUTES/MONTH
WEEKNIGHT     MINUTES/MONTH UNLIMITED
WEEKEND       MINUTES/MONTH UNLIMITED Minutes used information is also available by dialing #MIN# (#646#)

GET THE LATEST t-zones—a cool new way to shop
Give your phone personality with custom content and services. Get t-zones on your phone or check Communications Tools and Downloads below for new categories. Browsing is free and it's fun to check back for the latest updates. Extend your fun. Express your personality.

*FIG. 16B-1*

PLAN & SERVICES

- Group Contacts Plan
- Unlimited Weekend Minutes
- 400 Text Messages

▲ CHANGE PLAN OR SERVICES

GRAPHIC IMAGE HERE

GRAPHIC IMAGE HERE

PERSONAL COVERAGE CHECK

GRAPHIC IMAGE HERE

Check coverage where you work, live and play.

▲ CHECK COVERAGE

PERSONALIZED SUPPORT

? Information tailored to your phone, plan, and service

▲ GET SUPPORT

Group Contacts

Group Contact Plan

Free Calls to people that matter most to you!

MANAGE GROUP CONTACTS

▲ Learn More

COMMUNICATION TOOLS & DOWNLOADS t‑zones | YOUR PHONE | YOUR WAY

On your phone or on the Web, t-zones lets you add fun and features any way, any time.

MESSAGING

▲ SEND A TEXT MESSAGE
▲ HOW TO USE VOICEMAIL
▲ SET UP MY E-MAIL
▲ MY ALBUM
Send, share, and view picture messages

MUSIC & SOUNDS

GRAPHIC IMAGE HERE

▲ RINGTONES
Tones for every mood, or every day.
Boulevard of Broken Dreams
Green Day Mega Tones
Green Day HiFi Ringers

*FIG. 16B-2*

▲ SET ALERTS
Categories include headlines, weather, lottery results, sent straight to your phone.

WEB & APPLICATIONS

▲ T-MOBILEWEB
Search the mobile web, find places to go get news, weather, sports, online games, email, community chat and more anywhere you go.
▲ Learn about T-MobileWeb
▲ Sign up for T-MobileWeb
▲ Upgrade your phone online

GRAPHIC IMAGE HERE

▲ CALLERTUNES^SM
Customize what people hear when they call you.
▲ Learn more

Already using Caller Tunes?
▲ Log in now

WALLPAPER

▲ WALL PAPER
Redecorate your phone
Winnie the Pooh
More Disney wallpaper
Top wallpaper downloads

GRAPHIC IMAGE HERE

GAMES

▲ Your current phone does not support downloadable Games. Visit one of our stores to upgrade your phone to one that can receive Games!

▲ Find a T-Mobile Store

Store Locator | Support | Contact Us | Coverage | Refer a Friend
T-Mobile.com: About T-Mobile USA | ©2002-2005 T-Mobile USA, Inc. | Terms of Use | Terms & Conditions | Return Policy | Private Policy

*FIG. 16B-3*

My·T··Mobile··

Return to T-Mobile.com ▲ Not your phone? ▲ Tour My T-Mobile

PHOTO HERE | PHOTO HERE

Hello: John Doe
555_555_5555
▲MY PROFILE ▲Log out
Support for Samsung T609

BILLING | PLAN & SERVICES | PHONE & ACCESSORIES | DOWNLOADS | COMMUNICATION TOOLS | ASK T-MOBILE | SEARCH

MANAGE GROUP CONTACTS

Edit your selected group contacts in the form below, or edit them directly from your phone.
Please note that your selected group of contacts may only be changed once a month.

Edit your selected group of contacts

1. Name [Nate]        Number [208]-[732]-[8749]
2. Name [Christina Baker]  Number [425]-[444]-[1602]
3. Name [Mom Home]    Number 206-349-7723    ⓘ Edit numbers only once a month
4. Phone number change in progress from xxx-xxx-xxxx to xxx-xxx-xxxx
   ⓘ We will send a confirmation text message to your phone after the number has been verified
5. Name [      ]      Number [   ]-[   ]-[      ]

▲SAVE  ▲CANCEL

RESOURCES
▲US coverage map
▲International coverage
▲Learn about services
▲Your Plan

DOWNLOADS
▲Get More Group Contact Icons

FREQUENTLY ASKED QUESTIONS
When can I replace my Group Contacts?
Can I use my phone when I'm traveling overseas to call my Group Contacts?
Additional help Store Locator|Support|Contact Us|Coverage|Refer a Friend
T-Mobile.com: About T-Mobile USA|©2002-2005 T-Mobile USA, Inc.|Terms of Use|Terms & Conditions|Return Policy|Private Policy

PREFERRED CONTACT GROUP CENTRIC INTERFACE

CROSS-REFERENCE TO RELATED APPLICATIONS

This patent application is a continuation of U.S. patent application Ser. No. 14/089,259, now U.S. Pat. No. 8,954,891, entitled "PREFERRED CONTACT GROUP CENTRIC INTERFACE" and filed on Nov. 25, 2013, which in turn is a continuation of U.S. patent application Ser. No. 12/492,267, now U.S. Pat. No. 8,595,649, entitled "PREFERRED CONTACT GROUP CENTRIC INTERFACE" and filed on Jun. 26, 2009, which in turn is a continuation of U.S. patent application Ser. No. 11/400,925, now U.S. Pat. No. 7,685,530, entitled "PREFERRED CONTACT GROUP CENTRIC INTERFACE" and filed on Apr. 10, 2006, which in turn claims the benefit under 35 U.S.C. § 119(e) of U.S. Provisional Patent Application No. 60/689,581, filed on Jun. 10, 2005, the entirety of each of which are hereby incorporated by reference.

BACKGROUND

Field

This present disclosure relates generally to user interfaces that are centered about a user's preferred group of contacts on a communication device.

Description of the Related Art

Cellular telephones have become common communication tools in modern society. A wide variety of handset styles are available such as the "clam shell" flip-style cellular telephones, the non-flip or "candy-bar" style cellular telephones, and other cellular telephones with pivoting displays. While the internal designs of the cellular telephones may be quite different, each is generally designed ergonomically for maximum convenience and comfort. A variety of button and selector key configurations are also available, some with ergonomic design in mind and others with enhanced specialized functionality. Each cellular telephone has its own style and functional features that provide a unique set of user experiences.

Many modern cellular telephone devices also incorporate organizational tools that have traditionally been found in personal information managers or PIMs. Examples of PIM functionalities that may be incorporated into cellular telephone devices include personal call lists, business contact call lists, phone book information, calendars, personal reminders and other information. Moreover, the popularity of certain tools and functionalities traditionally associated with non-telecommunications devices, such as digital still and video cameras, MP3 players, and computers (with applications including e-mail, instant text messaging and photo messaging), have increased the interest in providing cellular telephone devices incorporating a wide variety of non-telecommunications functions.

The present disclosure has evaluated and contemplated a variety of these and other functions to provide a user interface system with ease of use that is centered about a user's preferred group of contacts. The group centered user interface is very useful in mobile or portable electronic devices such as cellular communication devices, PDAs, PIMs, as well as other devices. Moreover, the present disclosure contemplates that special billing systems may be applied to the group of contacts.

BRIEF DESCRIPTION OF THE DRAWINGS

FIGS. 16A-16E are illustrations of an example Web-based user interface for configuration and management of a preferred contact group user interface.

DETAILED DESCRIPTION

Figure 1:
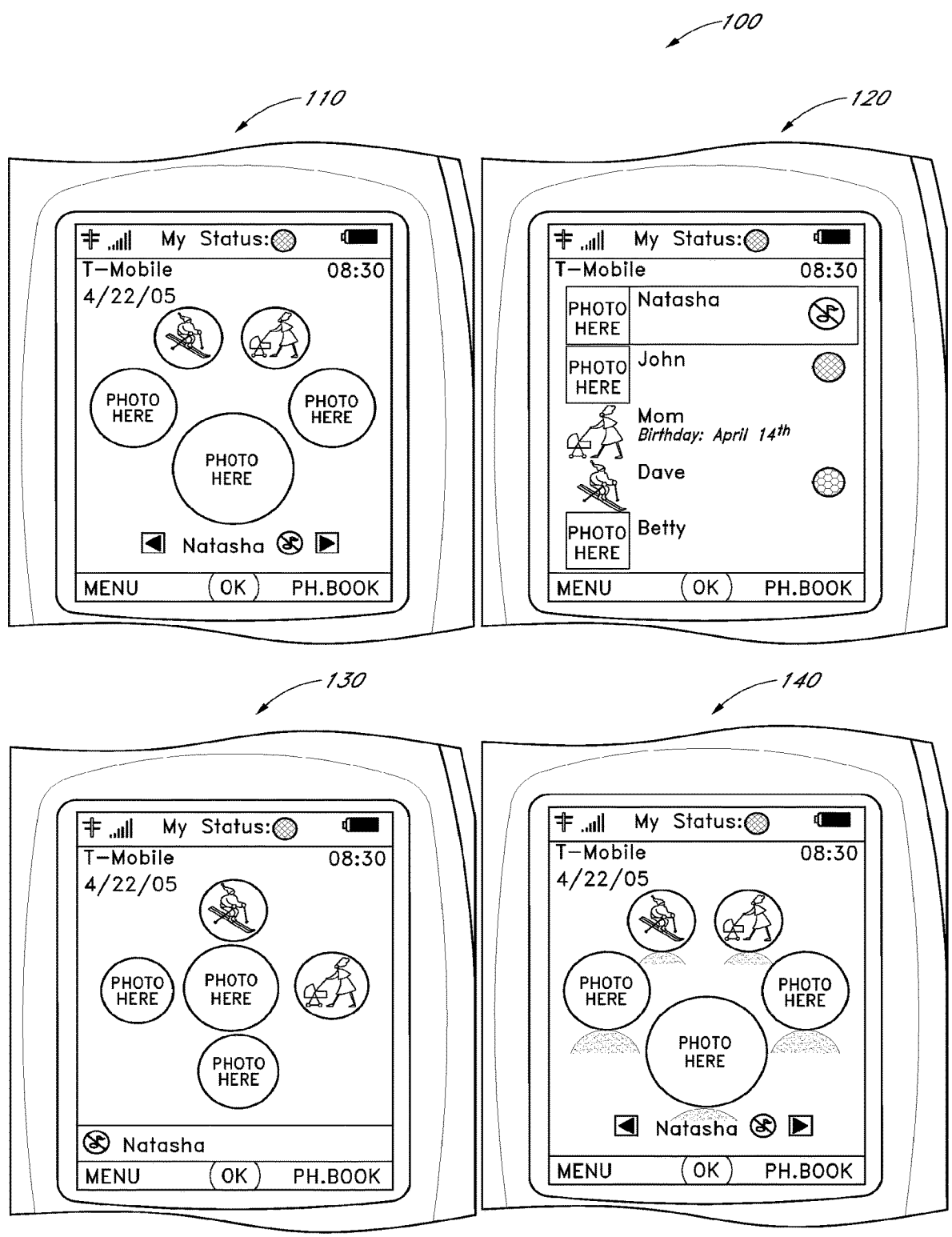
FIG. 1 is an illustration of various configurations of the user interface idle screen.

The present description relates to a preferred contact group centric interface that can be used to facilitate communications by the user with any of his or her designated preferred contacts via a communication device. The user interface can be arranged to activate from a user's "home page" on the display of his or her communication device, from an idle screen that is accessed after a timeout period expires, or any other appropriate mechanism that activates the preferred contact group centric experience.

Briefly stated, a preferred contact group centric interface for a communication device can be used to facilitate communications by a user. A user selects the preferred contact group from among an array of the user's contacts. Once the contact group is configured, a minimal number of navigation/selection features is necessary to activate any number of communication modes available to the contacts. The contact group is configured such that simple and quick navigation between the contact members is achieved. The contact group can be presented in two dimensional and three dimensional arrangements, and in any number of list or geometric configurations. A pricing plan may optionally be tied to the provision of communications services between the user and his or her preferred contact group.

The preferred contact group centric experience is designed to facilitate quick and easy selection of a contact from among an array of the user's contacts (as designated by the user), followed by quick and easy application selection from a variety of communications modes, including single-click initiation of a communication mode of a default contact or a default communication mode. Although many of the descriptions contained herein illustrate a grouping of five (5) key contacts related to the interface, the exact number of contacts is not significant and any number of contacts (e.g., 10, 20, 100, etc) can be employed individually or as part of groups. Moreover, the term communication device is intended to cover a wide variety of devices such as, for example, cellular telephone type devices, PDA/PIM style devices, as well as other devices that include communication facilities.

In one example, a display of five preferred contacts is presented on the idle screen of the user's communication device. The user may initiate a communication mode for a pre-selected default contact with a single click, or may swiftly traverse through his or her contacts using navigation keys configured for such purpose (e.g., up/down/left/right keys) until the desired contact is highlighted, then may initiate a pre-selected default communication to the highlighted contact simply by pressing the designated default key on the communication device or may traverse through numerous other communications modes that are available to communicate with the selected contact (e.g. e-mail, instant messaging, or photo messaging) simply by using navigation keys configured for such purpose (e.g., up/down/left/right keys) and then pressing a designated selection button on the communication device. The interface is contact group centric in that the interface experience commences with the selection of the desired recipient (either manually or by default) from the user's preferred contact group, followed by selection of the desired mode of communication with a selected contact (either via single-click initiation of a default mode of communication or via a communication mode menu).

While some conventional address book menus on communication devices do provide a minimal amount of person centric communications, the contact group centric interface is unique in that it provides a user with a novel method to select both preferred contacts and preferred communication modes through a single, visually appealing interface. The user's preferred contacts, as well as communications options relating to those contacts, may be presented in a list-styled arrangement, a circular-styled arrangement, an elliptical-styled arrangement, or some other geometric-styled arrangement such as pentagonal, hexagonal, "X" shaped, "T" shaped, or "+" shaped arrangements. In addition, the presentation of all communication modes in one location, accessible through presentation of the contacts on an idle screen, is novel to the preferred contact group centric interface. Example screenshots for various views of the preferred contact group centric interface are presented below, along with communication mode screenshots. User contacts are chosen in advance by the user and remain in the order selected until the user replaces or rearranges his or her contacts, thereby providing predictability in user interface interaction. For example, if the user selects "MOM" as his or her first contact, then only a single click of a designated key is required to call "MOM", until the user changes the order and moves "MOM" to another location among his or her preferred contacts. This is an important novel concept of the preferred contact group centric interface and an enhancement to current user interface experiences.

Current cellular telephone user interfaces are designed in a very feature centric manner. For example, to make voice calls on a conventional cellular telephone, users typically access the device's address book. In order to type and transmit a text message, the user must typically first access a "messages" menu and then select a "compose" function from the menu, followed by selecting the desired recipient of the message. While some cellular telephones do permit a user to send a text message, for example, from a phone book menu, this user experience is not optimal in terms of minimizing number of key clicks and overall ease of navigation. Requiring users to navigate to numerous menus and locations in the traditional user interface also negatively impacts of the user's ability to discover those features. In summary, the user experience for current cellular telephones is very feature driven rather than contact centric.

The preferred contact group centric interface brings the user's most-desired contacts "front and center" to the idle screen (or some other appropriate screen) of the device display. Through easy and intuitive selection of a desired contact among an array of contacts, the user is then able to quickly access a variety of communication modes available to communicate with the contact, such as initiating a voice call, sending a text, picture, voice or instant message (IM), or sending an email. The preferred contact group centric interface also enables a novel scalable user experience that provides a "front and center" presentation from which to add new communication services.

This concept may benefit both the end customer and the service provider (e.g., a wireless telecommunications carrier). The service provider supporting the communication device may offer special, desirable pricing plans in conjunction with the unique qualities of the preferred contact group centric interface. For instance, the service provider may offer a special price plan providing unlimited incoming and outgoing voice calls between the user and his or her designated preferred contacts. By way of further example, the service provider may expand its offering of unlimited services to include unlimited messaging as well as data use related to the user's designated preferred contacts. Further expansion of the price plan can include calling to international numbers.

The idle screen can be defined at the front/home screen of the communication device, and may include the name of the service provider, battery level, wireless signal strength, date, time, and may provide access to the menu functions of the phone.

The display of the user's contacts on the preferred contact group centric interface's idle screen can be integrated into the background wallpaper through transparency.

In another embodiment, the user's contacts can be a Web-enabled page that is downloaded from a network connection such as a Web page or a WAP page, possibly including active X, Java, Flash, or some other scripting or executable format that provides a uniform interaction on all similar communications devices. Contacts can be managed through the Web, or WAP, other over-The-air transport technology, a cable interface with the device or other connection to another device (e.g., personal computer).

FIG. 1 is an illustration of various configurations (100) of the preferred contact group centric interface idle screen. Screenshot 110 illustrates a circular style idle screen where each contact in the user's contact group is arranged about a center axis on the graphics display. The currently-selected contact is illustrated in the bottom center portion of the screen, but any designated location can be used for the selected contact. In example screenshot 110, the dimensions of the graphical icon (a photo in this case) are larger for the selected contact than the other non-selected contacts. In example screenshot 110, the dimensions of the graphical icon are determined by the physical screen location (e.g., bottom center is larger than right/left, which are larger than top right and top left) relative to an axis or rotation (to be discussed later). The dimensions associated with the graphical icons can be the same for every contact regardless of screen location, different for every contact based on screen location, or according to some other specified motif. Text identifying the selected contact's name is included beneath the associated graphical icon. The selected contact's name may also be overlaid on the graphic in a visually appealing manner.

Screenshot 120 illustrates a list-style idle screen configuration where each contact in the user's contact group is arranged in a vertical list about a linear axis with graphical icons positioned on the left hand side of the screen and text identifying the corresponding contacts name on right hand side of the screen. A selected contact is illustrated in an inverse video format or some other graphical form highlighting. In one example, the selected contact always appears in a fixed location on the display (e.g., the top most position, the bottom most position, the center position, etc.) and the user interface is arranged to vertically scroll up and down through the list. In another example, the highlighting indicator can be moved up and down through the contact list. In still another example, the list has a wrap-around effect where scrolling from the top of the display continues at the bottom of the list, and vice-versa. The list-style idle screen may also be displayed horizontally.

Screenshot 130 illustrates another circular style configuration where each contact in the user's contact group is arranged about a center axis on the display, with the currently-selected contact being located in the center of the other non-selected contacts. In example screenshot 130, the dimensions of the graphical icon (a photo in this case) are larger for the selected contact than the other non-selected contacts. Text identifying the selected contact's name is included around the bottom line of the graphical display.

Screenshot 140 illustrates another circular style configuration where each contact in the user's contact group is arranged about a center axis on the graphics display in a three-dimensional space. The dimensions of the graphical icon (a photo in this case) are larger for the selected contact than the other non-selected contacts. Text identifying the selected contact's name is included above the graphical icon, below the graphical icon, or overlapping the top portion of the graphical icon as illustrated in the figure. The graphical icons are depicted with a three-dimensional appearance that is akin to a sphere with an image wrapped around the visible face. The user interface can be arranged such that the selected icon can be changed by rotation about a three-dimensional axis. Shadows can be added to reflect a three dimensional look.

Each of the above-described idle screens permits the user to change the currently-selected contact by traversing the group of contacts in the user's contact group via the various navigation buttons/interfaces on the communication device (e.g., a wireless communication device, a cellular telephone, a PDA or PIN style device, etc.). A variety of graphical effects can be applied to the display screen when the user traverses the group of contacts appearing in the interface, such as an animated rotation effect, a picture swap effect, a fade-in effect, a fade-out effect, a fly-in effect, a fly-out effect, a dissolve-in effect, a dissolve-out effect, a spiral-in effect, a spiral-out effect, a slide-in effect, and a slide-out effect.

The preferred contact group centric interface that is described herein is described in terms of navigation/selection buttons and keys on the communication device, as well as other specially designated selectors that are used for initiating and cancelling telephone calls. However, any appropriate navigation/selection means is contemplated within the scope of this discussion including, but not limited to a keypad, a directional key, a dynamically assigned soft key, a joypad-style interface, a joystick-style interface, a trackball-style interface, a touch screen type interface, and a stylus type interface. Other means of navigation/selection can include side key push and hold, speech recognition, and gesture recognition.

Figure 2:
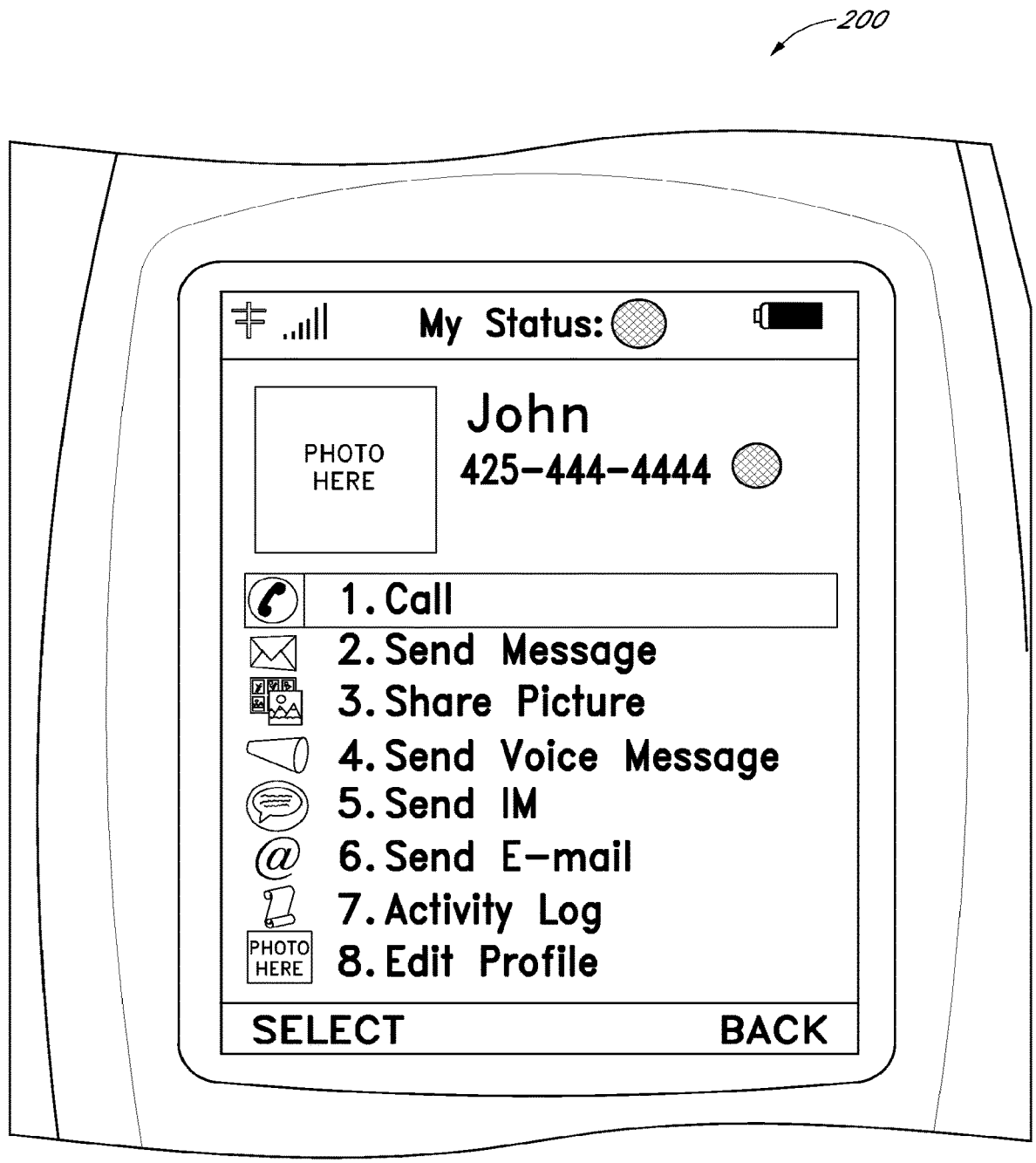
FIG. 2 is a screenshot of an example communication options menu for the user interface.

FIG. 2 is a screenshot of an example list-style communication options menu (200) for the preferred contact group centric interface. After selecting the options screen, a number of communication modes are accessible. For this example screen (200), a communication mode can be selected by traversing through the list of available communication modes and pressing the select key, or by pressing the corresponding number on the keypad. The illustrated communication modes include placing a telephone call ("1. Call"), sending a text message ("2. Send Message"), sending a picture ("3. Share Picture"), sending a voice message ("4. Send Voice Message"), sending an instant message ("5. Send IM"), and sending an email message ("6. Send E-mail"). Additionally, maintenance methods can be selected from the options screen such as, for example, viewing activity logs ("7. Activity Log") and editing the contacts profile ("8. Edit Profile").

Figure 3:
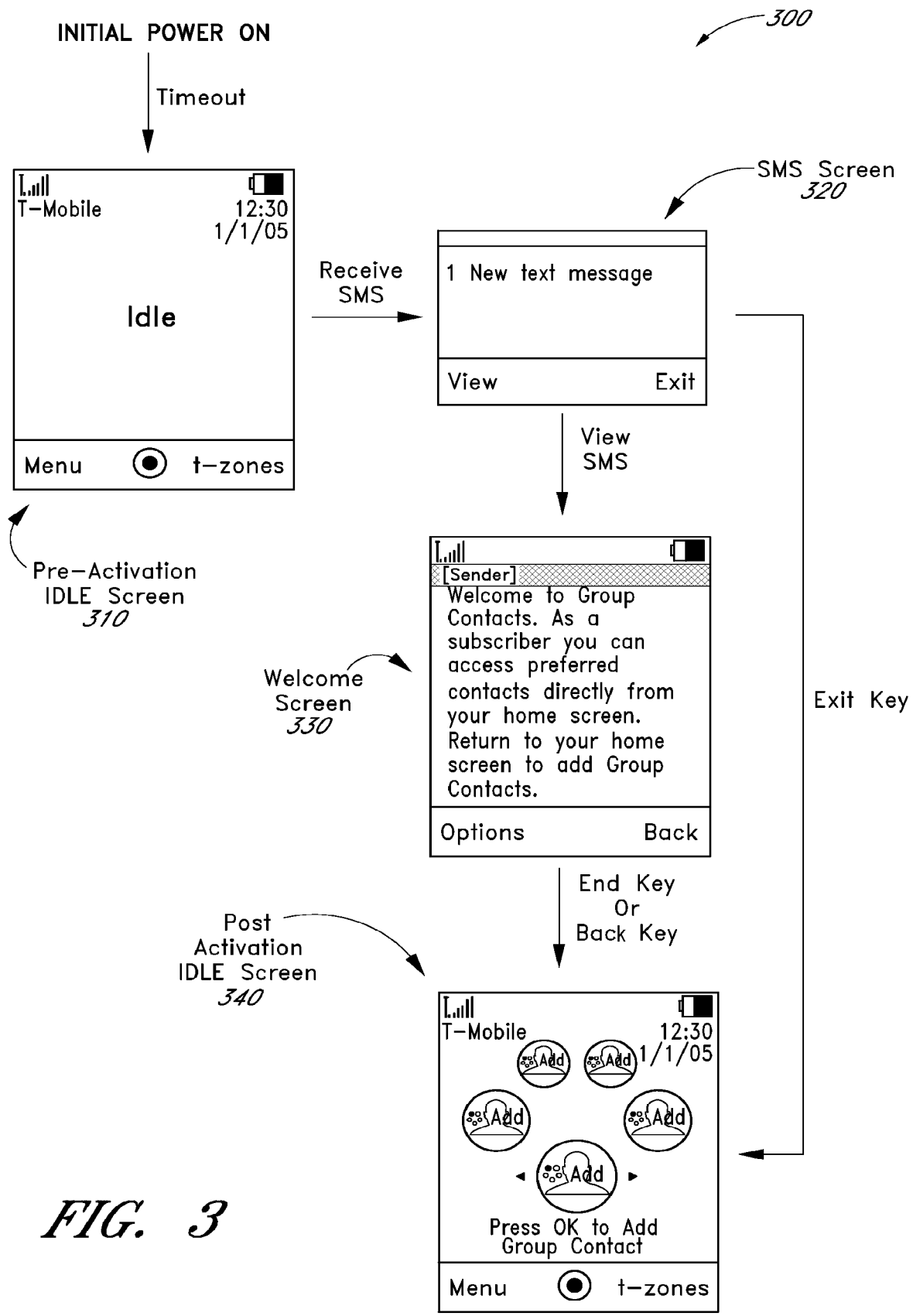
FIG. 3 is a diagram illustrating a first time power-up initialization sequence.

FIG. 3 is a diagram illustrating a first time power-up initialization sequence (300) that can be employed by a communication device in order to complete registration/activation with a service provider.

After initial power up, a timeout occurs and the communication device displays pre-activation idle screen 310. After activation is completed by the user with the service provider (e.g., via a telephone call, in a company store, over the Internet, or by other means), an SMS message is sent to the communication device. The communication device receives the SMS message and displays a text message receipt screen such as SMS screen 320. The user can either select "View" or "Exit" from SMS screen 320. Selection of "View" causes the communication device to display a welcome message such as welcome screen 330. The user can exit from welcome screen 330 by selecting "Options" or "Back", resulting in the communication device transferring to the preferred contact group centric interface's main or default screen, which is illustrated as post-activation idle screen 340. User selection of "Exit" from SMS screen 320 also results in the communication device changing to the post-activation idle screen 340.

Once the preferred contact group centric interface is available on the communication device, the default main screen or idle screen can be initialized for a selected group of contacts that are considered within the user's preferred contacts group. Special telecommunications pricing and/or services associated with the user's preferred contacts group may be associated with a special pricing plan. When the user's preferred contacts are keyed to a special pricing plan, a service provider may desire that the user's group membership be changed only at the beginning of a billing cycle or during some other revolving enrollment period. The user may designate the membership of his or her preferred contact group via the communication device, a customer service center representative, a computer connected through the Internet, or some other mechanism.

Figure 4:
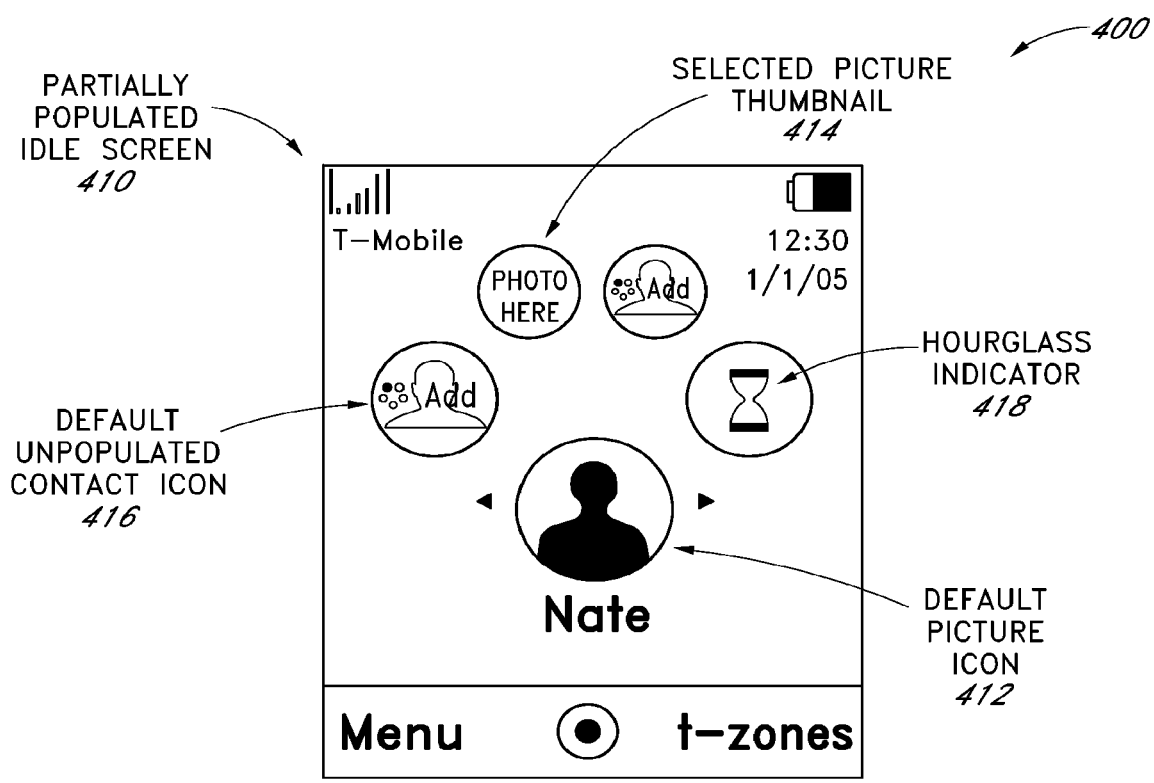
FIG. 4 is an illustration of example idle screens and other features related thereto.
Figure 4:
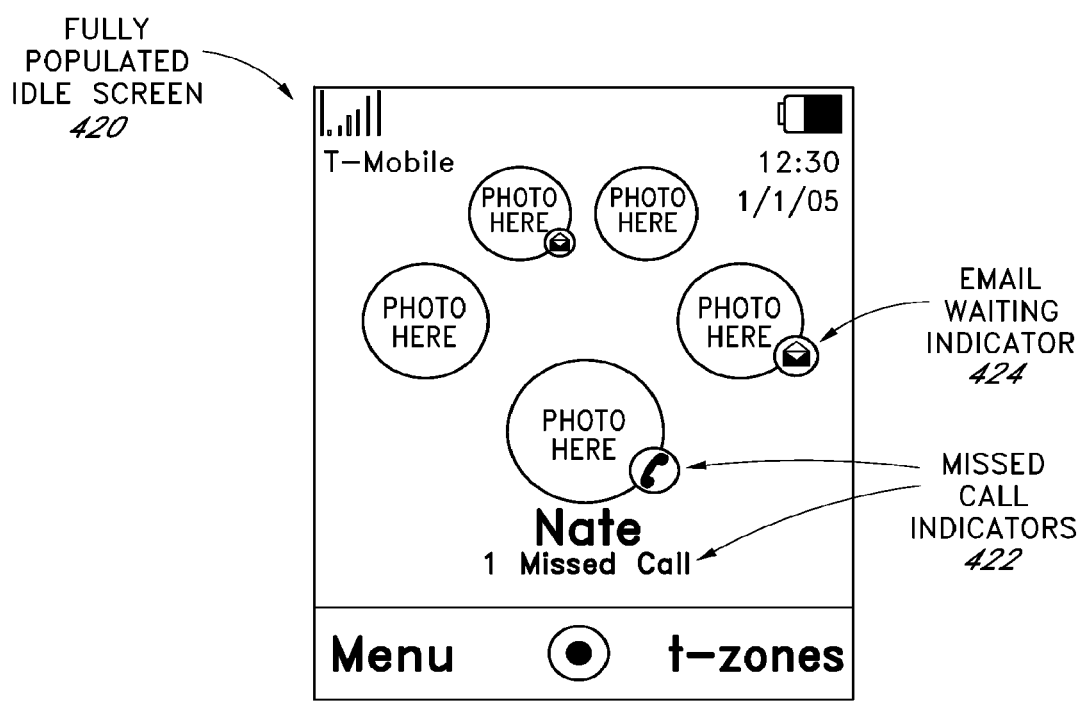

FIG. 4 is an illustration of example idle screens (400) and other features related thereto.

A partially-populated idle screen includes a mix of graphical identifiers associated with the user's preferred contacts, as illustrated in idle screen 410 of FIG. 4. A default picture icon can be used to represent a preferred contact in the group if no other graphical identifier has been assigned by the user, as illustrated by default picture icon 412. A thumbnail size picture can be assigned to a preferred contact as illustrated by icon 414. An unpopulated or unassigned icon includes another graphical identifier to indicate that another contact can be assigned to the group as illustrated by default unpopulated contact icon in 416.

A fully populated idle screen includes a mix of graphical identifiers associated for the various preferred contacts as illustrated in screenshot 420 of FIG. 4. Each contact in the user's preferred contact group is illustrated with thumbnail pictures in this example, but is not so limited. Optional status indicators can be dynamically assigned to the graphical indicators as illustrated by example indicators 422 and 424. Indicators 422 illustrate a graphical indicator and a text indicator for a missed telephone call from one identified contact (e.g., Nate). Indicator 424 illustrates that an email message is waiting from another identified contact. Other indicators can also be associated with a contact, such as graphical icons and/or text strings as may be desired for a variety of indications such as text message waiting, voice message waiting, picture message waiting, as well as others.

The optional status indicators can also be tied to a variety of other features, such as presence information, upcoming dates and appointments, and a mood level associated with the particular contact.

Presence information indicators can reveal the contact's current availability status (e.g., "available", "unavailable", "on-line", "off-line", "busy", "out to lunch", "in a meeting", "be right back", "away"), their location status ("at the corner of $5^{th}$ Ave."), as well as other user configurable presence indicators (e.g., "meet me for lunch at 2 PM").

Upcoming dates and appointments indicators can reveal the contact's birthday, anniversary, and other important dates and appointments.

Mood level indicators can be utilized to project a likely mood upon a preferred contact, such as happy, sad, or ambivalent, wherein the mood level can be changed dynamically based on a number of criteria. For example, if a user has not contacted a preferred contact recently, or not as frequently as other contacts from the user's preferred contact group, the mood indicator may designate the contact as sad. In contrast, a frequently contacted contact can have a mood indicator of happy. The mood indicators can also be tied to other items, such as a daily horoscope, or updated in response to a presence data that is provided by the contact, such as through an instant messaging program.

Other information such as current physical location of the contact (e.g., near the user, in the same city as the user) using location based technology can also be displayed. In addition, relevant content related to the contact may also be displayed (e.g., if contact is interested in a specific musical act, then the musical act's upcoming concert date can be displayed, along with a hotlink to purchase tickets).

Figure 5:
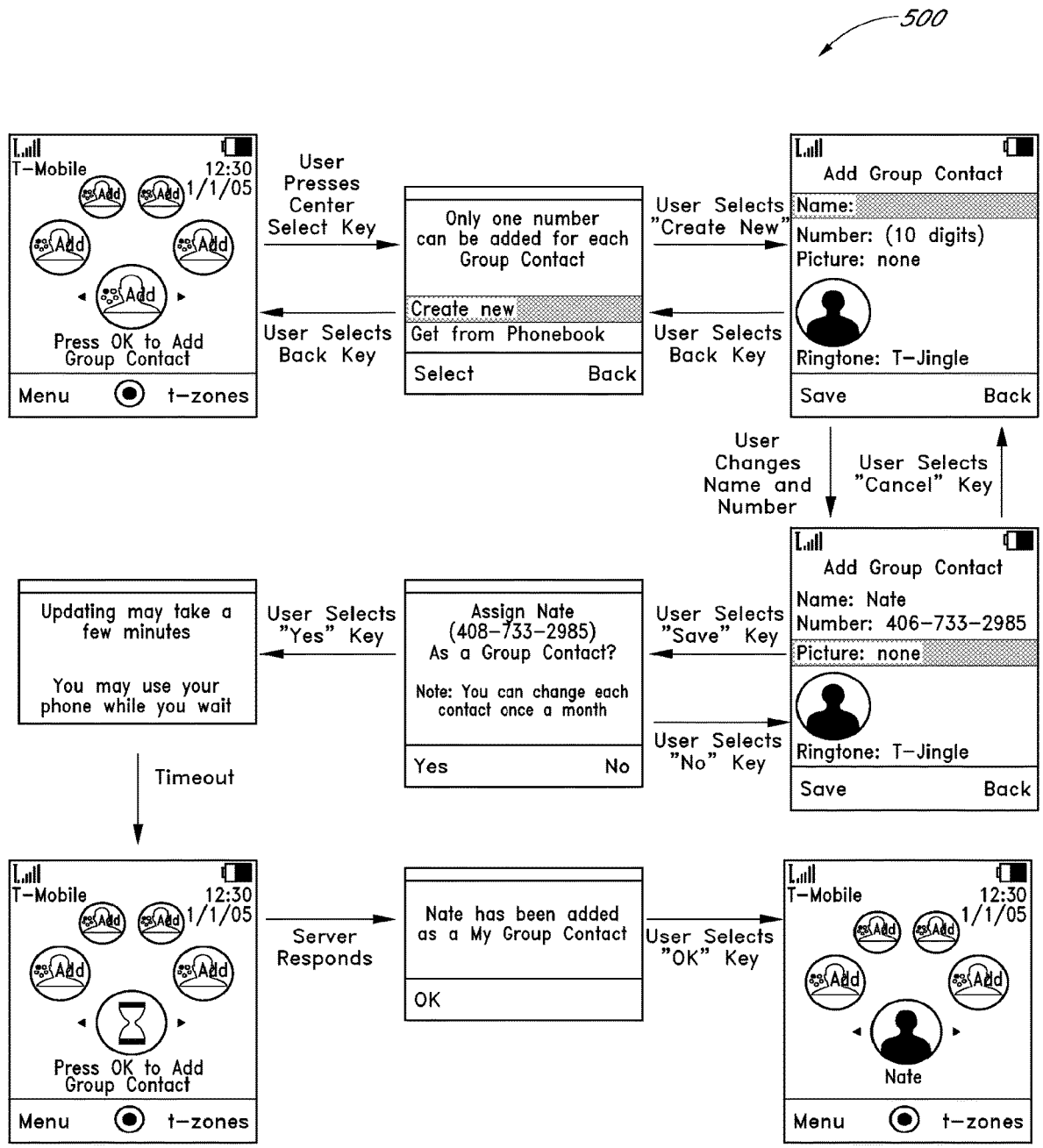
FIG. 5 is an illustration of a user interaction sequence for a user interface for adding preferred contacts.

FIG. 5 is an illustration of a user interaction sequence (500) for adding preferred contacts. The process flow (500) of FIG. 5 begins at the depicted unpopulated idle screen.

The user can press the "Select" key (e.g., the center button on a joypad, an "OK" button, or some other button) from the idle screen to add a contact for the currently selected contact group member. The pressing of the "Select" key results in another screen that either replaces the current screen with an "Add Group Contact" dialog or overlays the current screen (e.g., a pop-up window). The dialog notifies the user that a new contact is being added to the currently selected group (which was unpopulated in this example). The preferred contact group centric interface also permits the user to select "Create new", "Get from phonebook" or "Back." Selection of "Back" cancels the "add contact" dialog box and returns to the idle screen.

Selection of "Create new" from the "Add Group Contact" dialog transitions the preferred contact group centric interface to a "Create new" template with one or more data entry fields such as name, number, picture, etc. The fields could also include a wide variety of additional information, including e-mail address, home address, birthday, favorite ice cream, place of birth, and other information. The user can return to the prior screen with selection of the "Back" key, or enter data into one or more of the various data entry fields.

Data can be entered into the data entry fields using various keys and/or input devices available for the communication device. Once the user has entered data, the user can either cancel the entered data or select the "Save" key. Pressing the "Cancel" key returns the preferred contact group centric interface to the prior screen, which is the "Add Group Contact" dialog, while pressing the "Save" key transfers the preferred contact group centric interface to a confirmation dialog.

The confirmation dialog requests the user to approve saving the information for the selected contact from the user's preferred contact group. Approval can be rejected by the user by depressing one key function (e.g., "No"), or accepted by depressing another key function (e.g., "Yes"). Rejection of approval returns the process to the prior screen. When approval is accepted, the entered data is transmitted by the communication device to the service provider for records updating, and a dialog screen is displayed to indicate that the server is being updated.

After a timeout period has expired, processing returns to the idle screen where a wait indicator (e.g., an hourglass) is displayed for the previously selected icon. After the service provider has updated records for the communication device on server, a message is transmitted to the communication device to indicate that the records have been successfully updated (or perhaps an error message if some other error occurs). The updated records dialog screen can be dismissed with a user interaction such as pressing an "OK" button, and the user interface resumes the idle screen with the populated contact now present.

Figure 6:
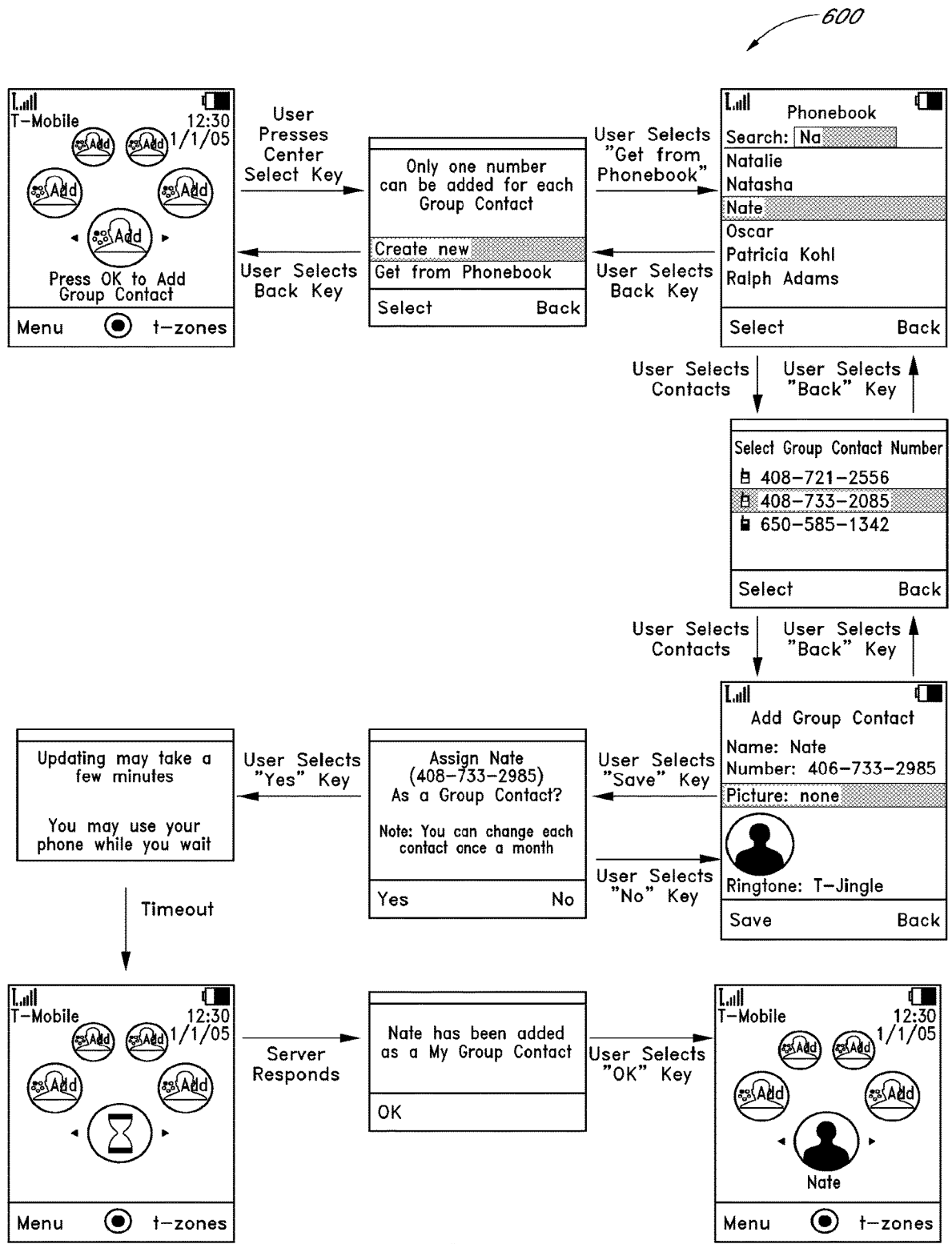
FIG. 6 is an illustration of a user interaction sequence for another aspect of a preferred contact group interface for adding preferred contacts.

FIG. 6 is an illustration of a user interaction sequence (600) for another aspect of a preferred contact group centric interface for adding preferred contacts. The process flow (600) of FIG. 6 begins at the depicted unpopulated idle screen.

The user can press the "Select" key (e.g., the center button on a joypad, an "OK" button, or some other button) from the idle screen to add a contact for the currently selected contact group member. Pressing the "Select" key results in another screen that either replaces the current screen with an "Add Group Contact" dialog or overlays the current screen such as a pop-up window style. The dialog notifies the user that a new contact is being added to the currently selected group member (which was previously unpopulated in this example). The user interface also permits the user to select "Create new", "Get from phonebook" or "Back." Selection of "Back" cancels the "Add Group Contact" dialog box and returns to the idle screen.

Selection of "Get from phonebook" from the "Add Group Contact" dialog transitions the user interface to a phonebook interface such as from a contact manager type application. A previously entered contact can then be selected from the phonebook using the various keys and/or input devices available in the contact manager. Once the user has selected the contact, the user can either cancel the selection (e.g., selecting "Back"), or select a telephone number (e.g., from a list of available numbers such as a home number, a cell phone number, etc.) for the contact. After the desired phone number is selected, the user can either save the selected contact information (e.g. "Save") or cancel and return to the prior screen (e.g., "Cancel"). The confirmation dialogs, approval/rejection, and remaining steps in FIG. 6 are substantially the same as that described for FIG. 5.

Figure 7:
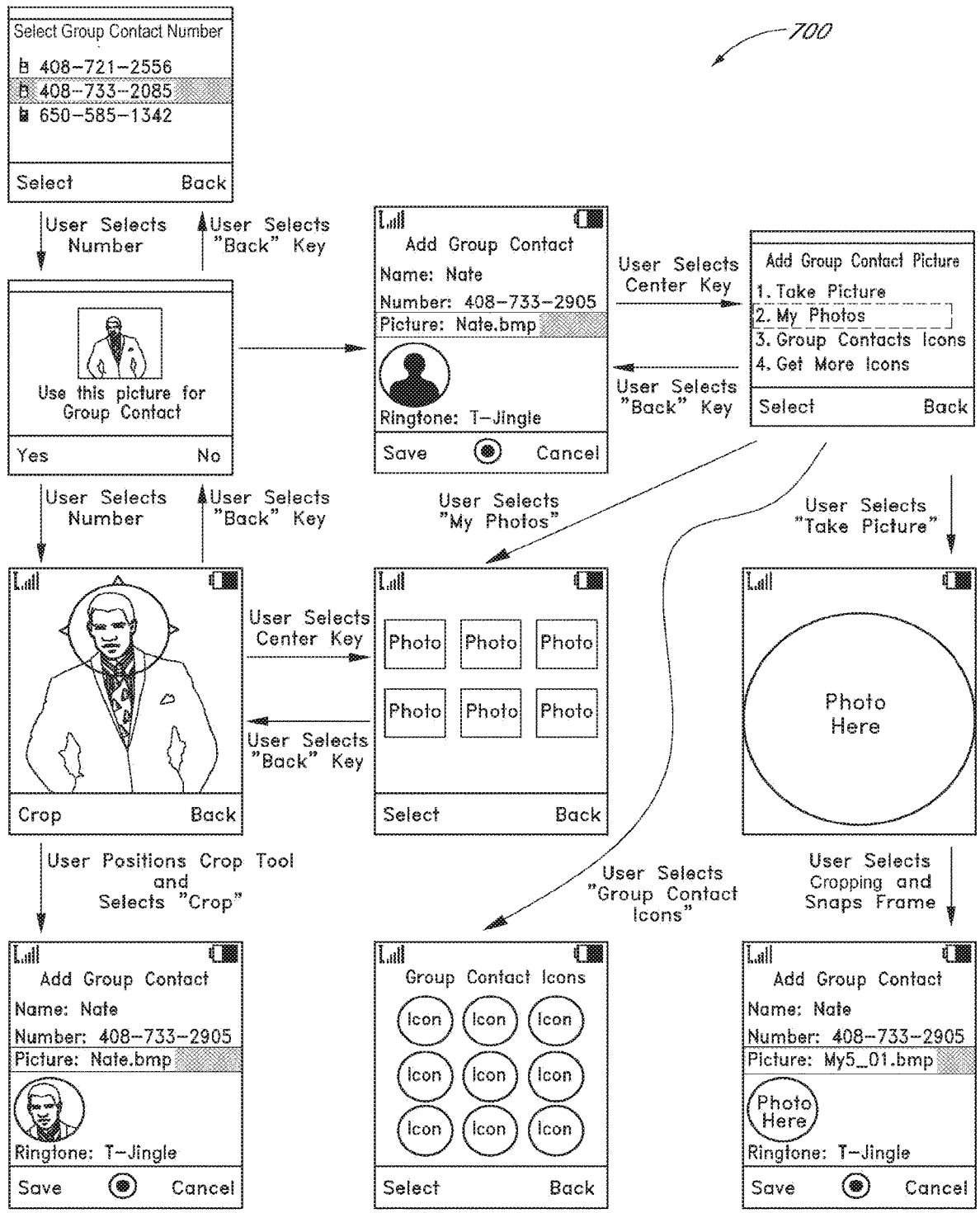
FIG. 7 is an illustration of an example user interaction sequence for selection of a picture for a preferred contact.

As previously stated, each contact in the user's preferred contact group can have an associated graphical icon for display on the idle screen. FIG. 7 is an illustration of an example user interaction sequence (700) for selection of a picture for a preferred contact. In one example, the interaction of FIG. 7 occurs when the contact is initially selected such as from a contact manager application as previously described. A default picture might already be assigned to the identified contact such as when a photograph is assigned to the contact in a contact manager application. For this example, a dialog screen is displayed requesting approval or rejection of the default picture after the telephone number is selected.

Approval of the default picture opens a photographic edit tool that includes a crop tool that operates similar to a graphical cursor. The crop tool can be positioned on a desired region of the picture by the user. Optionally, the crop tool can also be configured to zoom in and out of the picture region to provide a desired image size for cropping. Selection of "Crop" will transition the user interface to a "Save" dialog window that permits approval or rejection of the cropped photo. Selection of "Back" aborts the crop tool back to the prior screen, which is the "Use default" picture dialog screen previously described.

When the default picture is rejected, another dialog screen is displayed that includes various data fields for the user's preferred contact. The user can then press the "Select" key or "Center" key over the picture field to select the photo from a number of sources such as a digital camera interface (e.g., "Take Picture") that is built into the communication device, a file folder such as "My Photos", an icon such as "Group Contact Icons", or some other source such as downloaded icons. Selection of "Take Picture" causes the communication device to activate its facility for taking pictures, followed by cropping the picture, and the various approval and rejection dialogs previously described. Selection of "My Photos" results in activation of a file manager type of tool that permits selection of a photograph from a file folder, activation of the crop tool, and the various approval and rejection dialogs previously described. Selection of "Group Contact Icons" results in activation of a file manager type of tool that permits selection of an icon from a file folder, followed by the various approval and rejection dialogs as previously described. Selection of "Get More Icons" results in the launch of an Internet based browser (e.g., WAP) allowing the user to download more icons.

Figure 8:
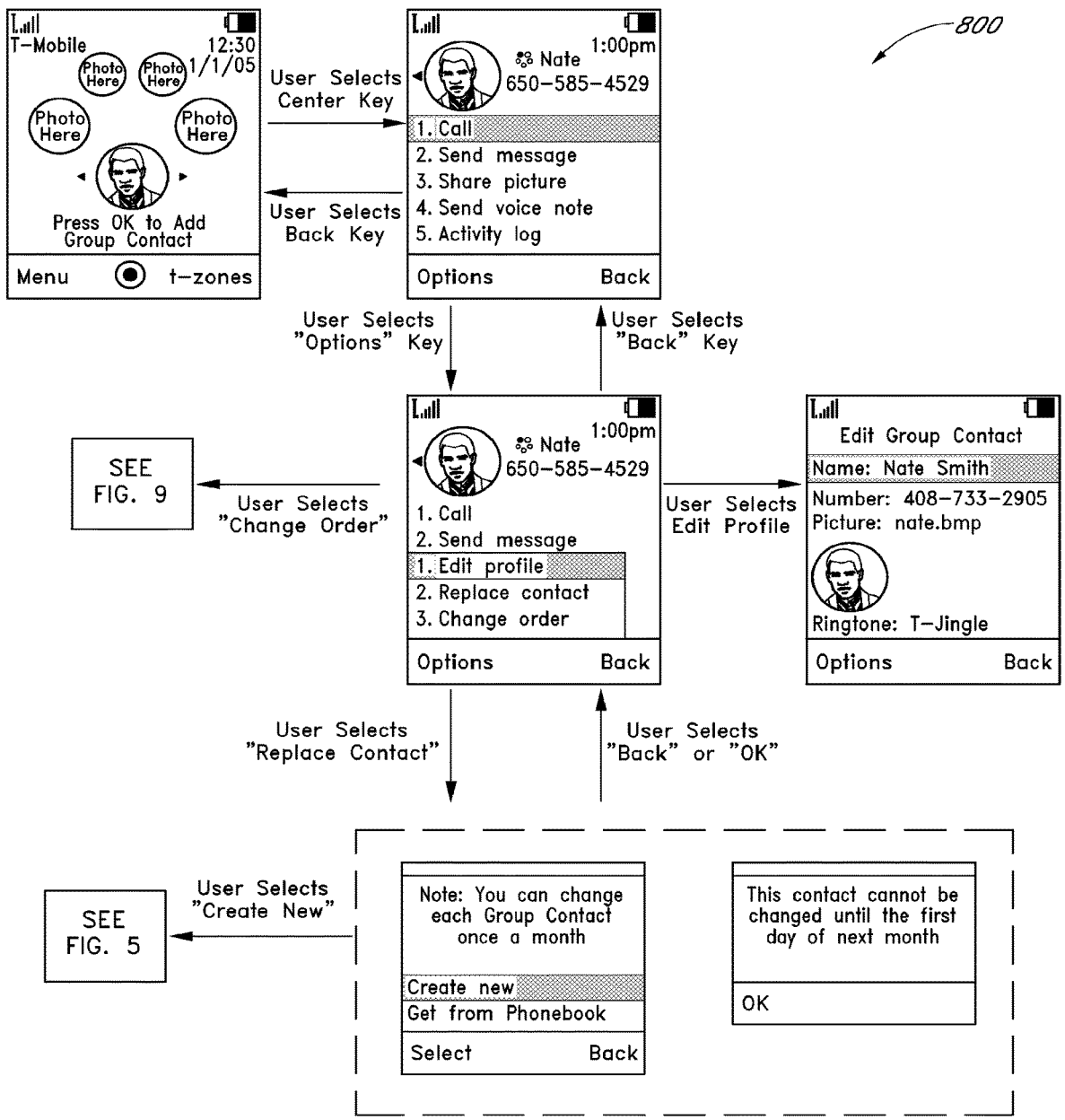
FIG. 8 is an illustration of an example interaction sequence for modification of preferred contacts.

It is anticipated that a user may desire to edit the information associated with a member of the user's preferred contact group, or replace the contact with another more desirable contact. FIG. 8 is an illustration of an example interaction sequence (800) for modification of preferred contacts. From the idle screen, the selection key is depressed to recall various options that are available for a previously configured contact in the user's preferred contact group. Selection of the "Options" key permits the user to select any one of "Edit Profile", "Replace Contact" or "Change Order" for the selected contact. Selection of "Edit Profile" permits the user to change any one of the data fields that are associated with the selected group contact.

Section of "Replace Contact" causes another dialog series, such as warning messages that a contact cannot be changed until the next billing cycle, or some other dialog such as a screen warning that the contact can only be replaced once a month. This dialog screen can be the result of a check with the network to confirm inability for the user to make the change. An approval/rejection dialog can then be exercised to permit replacing the contact.

Figure 9:
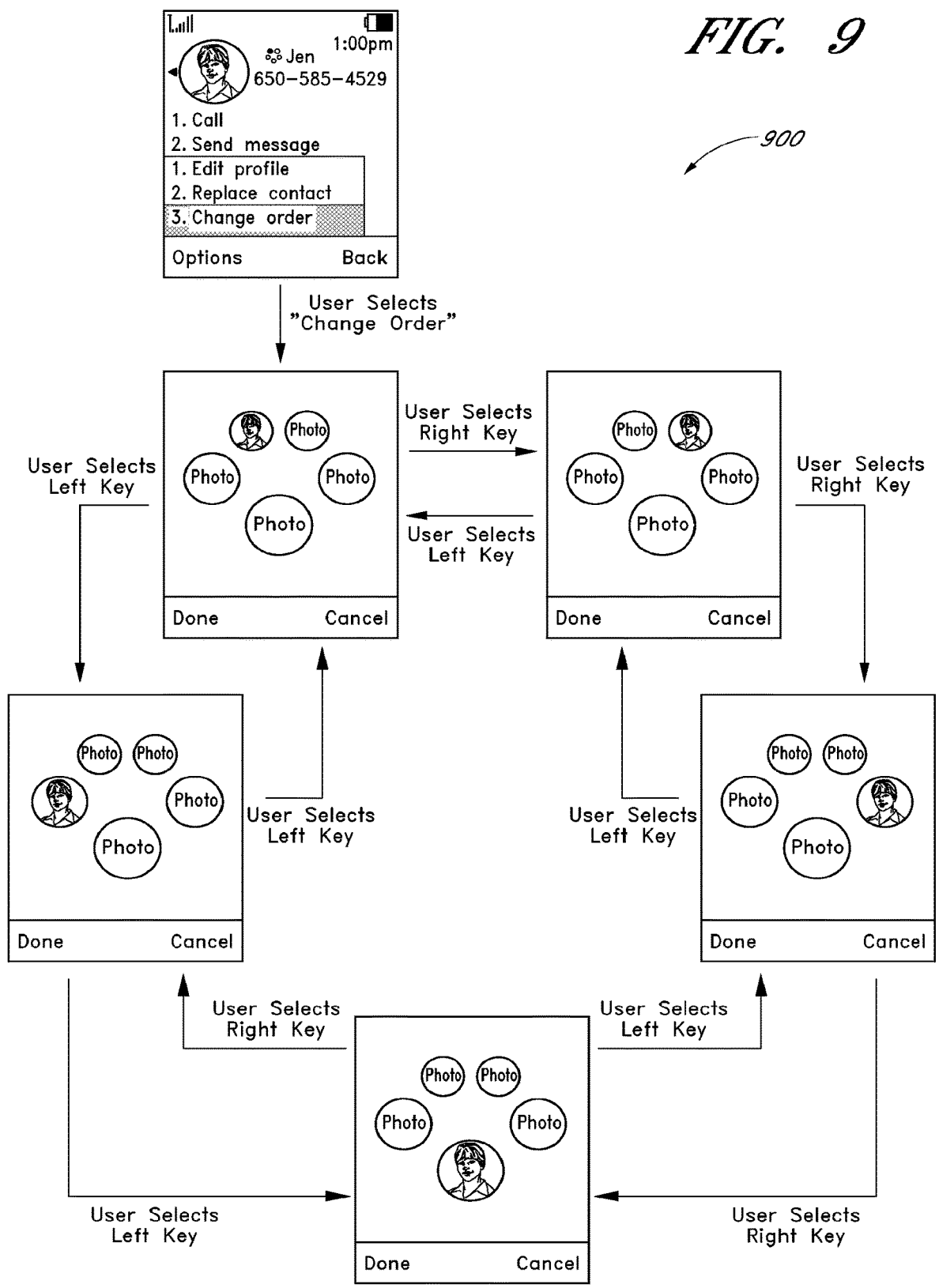
FIG. 9 is an illustration of an example user interaction sequence to change the order of the user's preferred contacts.

FIG. 9 is an illustration of an example user interaction sequence (900) to change the presentation order of the user's preferred contacts. User interaction associated with the "Change Order" selection from the options screen of FIG. 8 can also described with reference to FIG. 9. Once the "Change Order" selection is made, the user can utilize the left/right keys or some other set of keys to rotate the currently selected group member though the various ordering positions. In this example, a circular arrangement is used for the group members about a center axis on the screen. Pressing the left key rotates the selected contact in a counter-clockwise manner, while pressing the right key rotates the selected contact in a clockwise manner. Once the desired order position is reached, "Done" can be selected. Alternatively, the user can cancel changing the ordering of the contacts.

Figure 10:
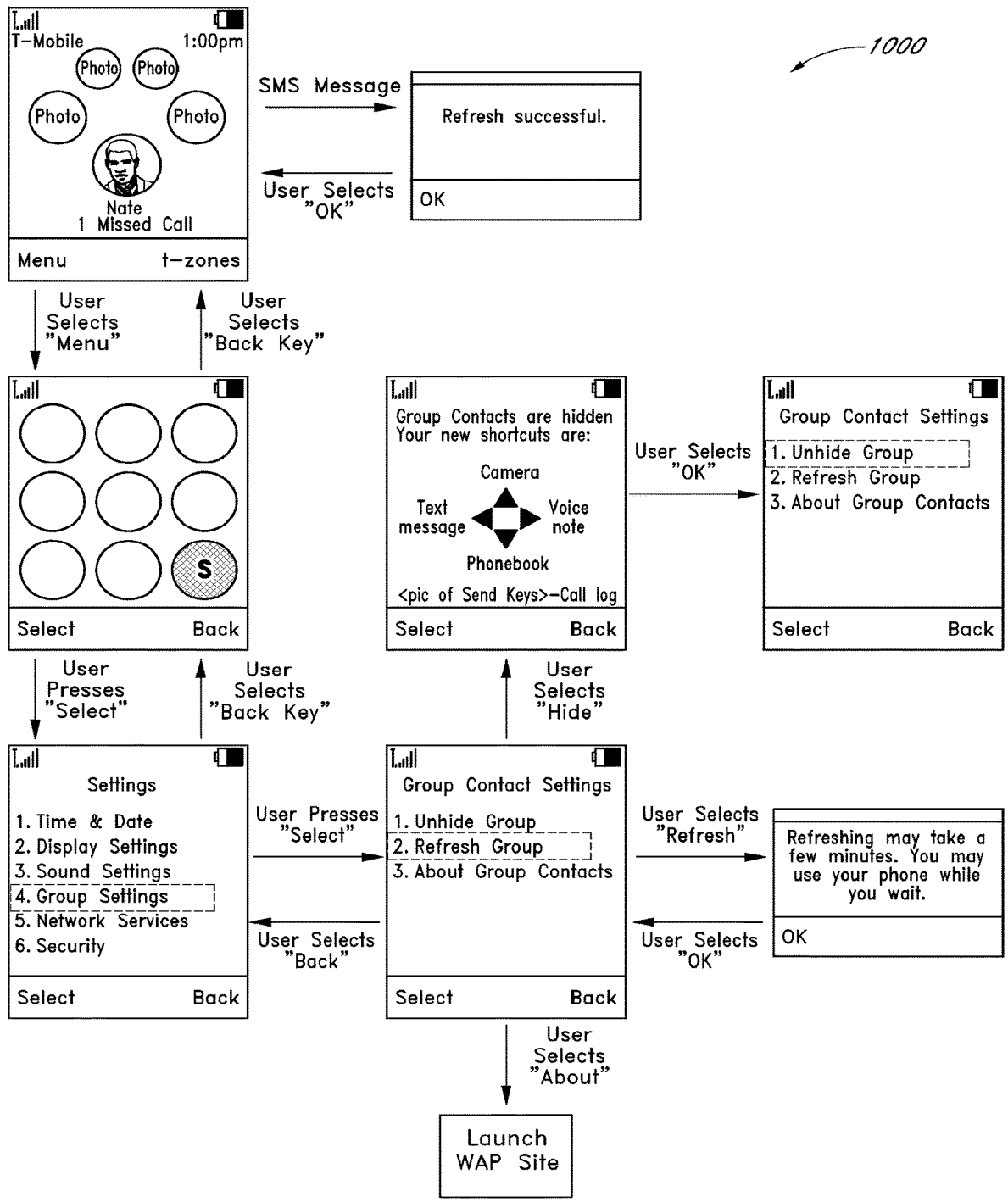
FIG. 10 is an illustration of an example user interface interaction sequence for changing various settings associated with the preferred contact group centric interface.

FIG. 10 is an illustration of an example user interface interaction sequence (1000) for changing various settings associated with the preferred contact group centric interface. The interaction begins at the IDLE screen where the user selects "Menu". A series of icons are presented that represent all of the various menu options, including a settings icon. The settings icon is illustrated by an S, but any graphical and/or text based icon can be utilized as the settings icon. The user navigates the selection cursor to the settings icon and presses "Select" to activate the settings menu, or alternatively presses "Back" to return to the prior screen (the idle screen in this case).

From the settings menu, a variety of setting parameters are accessible, such as "1. Time & Date", "2. Display Settings", "3. Sound Settings", "4. Group Settings", "5. Network Services", and "6. Security". Selection of the designated number key (4 in this example) or navigating the cursor to the "Group Settings" and pressing the selection button activates the "Group Contacts Settings" menu. A "Back" interaction can also be used to return to the prior screen.

From the "Group Contact Settings" menu a number of selections are available such as "1. Hide Group", "2. Refresh Group", and "3. About Group Contacts". Selection of "Hide Group" disables the idle screen from showing the preferred group contacts and a dialog screen is displayed that indicates the assignment of various shortcuts and related settings. Once "OK" is selected, the dialog screen is dismissed and the group contacts settings menu toggles "1. Hide Group" to "1. Unhide Group". Selection of "Refresh Group" sends a message to the server requesting that the preferred group contact settings be updated, resulting in a dialog screen (which can be dismissed with "OK") that refreshing may take a few minutes. Selection of "About Group Contacts" launches an Internet based site such as a WAP site. From the WAP site, the wireless carrier can provide a number of additional menu selection items, additional information about the current settings, or any other desired interaction.

The settings menu can also include other settings such as Animation Settings that allow the user the option to choose different ways in which the group contacts are animated. In one example animation setting, the visible contacts on the device's display screen are animated by rotating about a rotational axis when the user changes the currently selected contact. In another example animation setting, the visible contacts on the device's display screen are animated by fade-in and fade-out effects. In still another example animation setting, the visible contacts on the device's display screen are animated by fly-in and fly-out effects. Other effects may also be selected with an animation setting, including disabling the animation effects.

Figure 11:
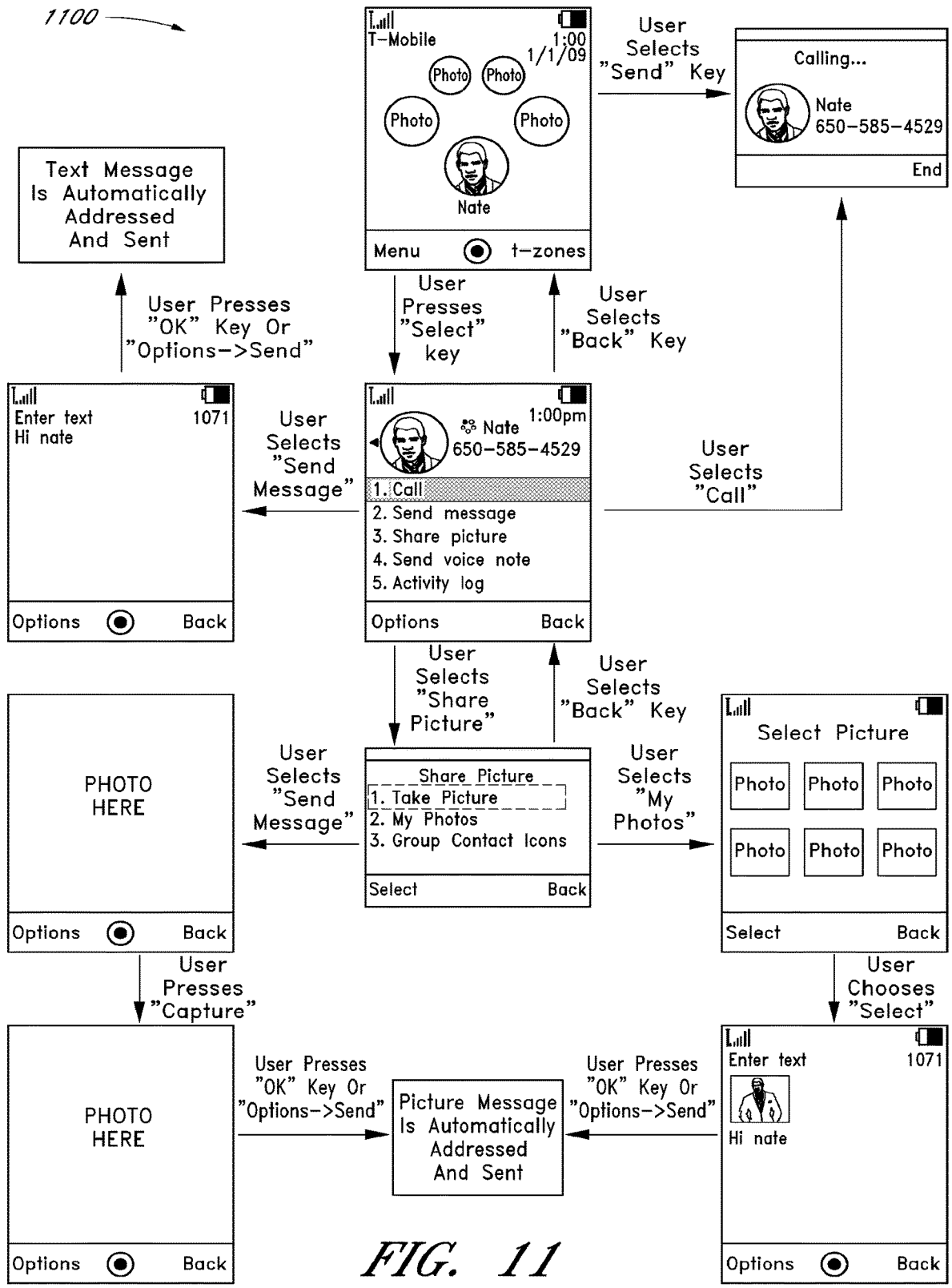
FIG. 11 is an illustration of an example user interface interaction sequence that illustrates various communication modes associated with a preferred contact.

FIG. 11 is an illustration of an example user interface interaction sequence (1100) that illustrates various calling/communication modes associated with a user's preferred contacts. The interaction begins at the preferred contact group centric interface's idle screen where the user can navigate to a preferred contact, and either press the "Send" key or press the "Select" key for the currently selected preferred contact.

Selection of the "Send" key (or some other previously assigned key) from the idle screen results in the communication device activating a pre-selected communication mode associated with the currently selected contact. The pre-selected communication mode can be pre-configured for a default communication mode, or user configured. In one example, the pre-selected communication mode for each contact in the group of contacts can be different from one another. In another example, the pre-selected communication mode for each contact in the group of contacts are the same. In one example, the pre-selected communication mode is simply to place a telephone call to a previously designated phone number for the contact, as shown by the "Calling . . . " dialog screen.

As depicted in FIG. 11, a telephone call to a currently selected contact is quickly and easily placed without requiring the user to traverse through additional menu screens. Instead, the currently selected contact (e.g., "Nate") is selected with a single click user selection. The single click user selection can be effected by any means such as depressing a dedicated selection key (e.g., "talk"), depressing a user configured soft key, or any other user input device such as a touchscreen, touchpad, joypad, joystick, etc. Since the pre-selected communication mode (e.g., "place phone call") is activated with a single-click on the device, the user interface is very simple and efficient.

Pressing the "Select" key from the idle screen results in the communication device activating a communication options menu for the currently selected contact. The list of contacts can revert to the original state, for example immediately after the call has ended or the message has been sent or after a brief timeout (e.g., 5 seconds).

The communication options menu includes a set of choices such as "1. Call", "2. Send Message", "3. Share Picture", "4. Send Voice Note" and "5. Activity Log", similar to that described for FIG. 2. The communication options menu permits changing the selected contact with navigation buttons such as left and right without returning to the idle screen, or returning to the idle screen in response to "Back". Selecting "Call" from this menu places a telephone call in the manner discussed above.

Selecting "Send Message" from the communication options menu activates a text message interface. The user can enter and send text messages from the messaging interface. The preferred contact group centric interface automatically retrieves address data associated with the currently selected preferred contact such that selection of "OK" or "Options→Send" sends the message without further user interaction.

Selecting "Share Picture" from the communication options menu activates a picture-sharing interface that includes selections such as "1. Take Picture", "2. My Photos", and "3. Group Contact Icons". Selection of "Take Picture" activates a digital camera interface on the communication device, where digital pictures can be captured by activating the electronic shutter (e.g., "Capture"). Selection of "My Photos" activates a file manager interface on the communication device, where digital pictures can be selected. Once again, the user interface automatically retrieves address data associated with the currently selected preferred contact such that selection of "OK" or "Options-→Send" sends the captured or selected photo without further user interaction.

Figure 12:
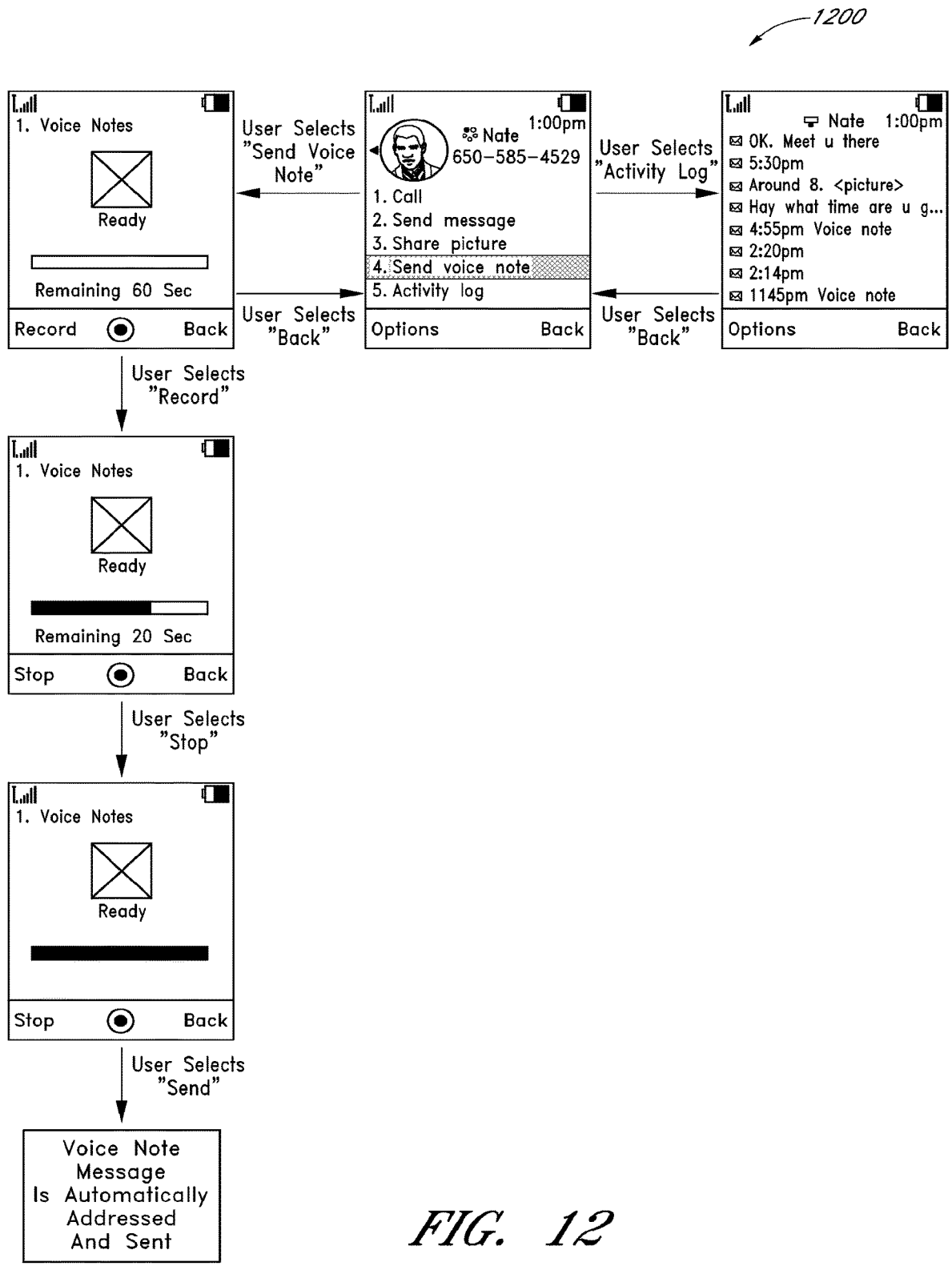
FIG. 12 is an illustration of an example user interface interaction sequence that illustrates additional communication modes associated with a contact.

FIG. 12 is an illustration of an example preferred contact group centric interface interaction sequence (1200) that illustrates additional communication modes associated with a preferred contact. The interaction begins at the communication options menu, which includes a set of choices such as "1. Call", "2. Send Message", "3. Share Picture", "4. Send Voice Note" and "5. Activity Log", similar to that described previously for FIG. 2.

Selecting "Send Voice Note" from the communication options menu activates a voice note interface where a voice message can be recorded by selecting "Record". The user dictates the voice message to the communication device and presses the "Stop" key to end the recording. As may be desired in any interface, the voice note interface is illustrated with a "Back" key feature that permits returning to a prior screen such as the communication options menu. Similar to that discussed previously, the preferred contact group centric interface automatically retrieves address data associated with the currently selected preferred contact such that selection of "Send" transmits the recorded voice note without further user interaction.

Selecting "Activity Log" from the communication options menu activates a communications activity log interface that is associated with the selected contact. Communication activities for the selected contact are then displayed on the screen. The activity log can include any number of activities such as, for example, time and date of phone calls, text messages, voice notes, pictures received, etc. The activity log interface is illustrated with a "Back" key feature that permits returning to a prior screen such as the communication options menu. Additional options can also be available from the activity log interface such as "clear history", as well as others.

Figure 13:
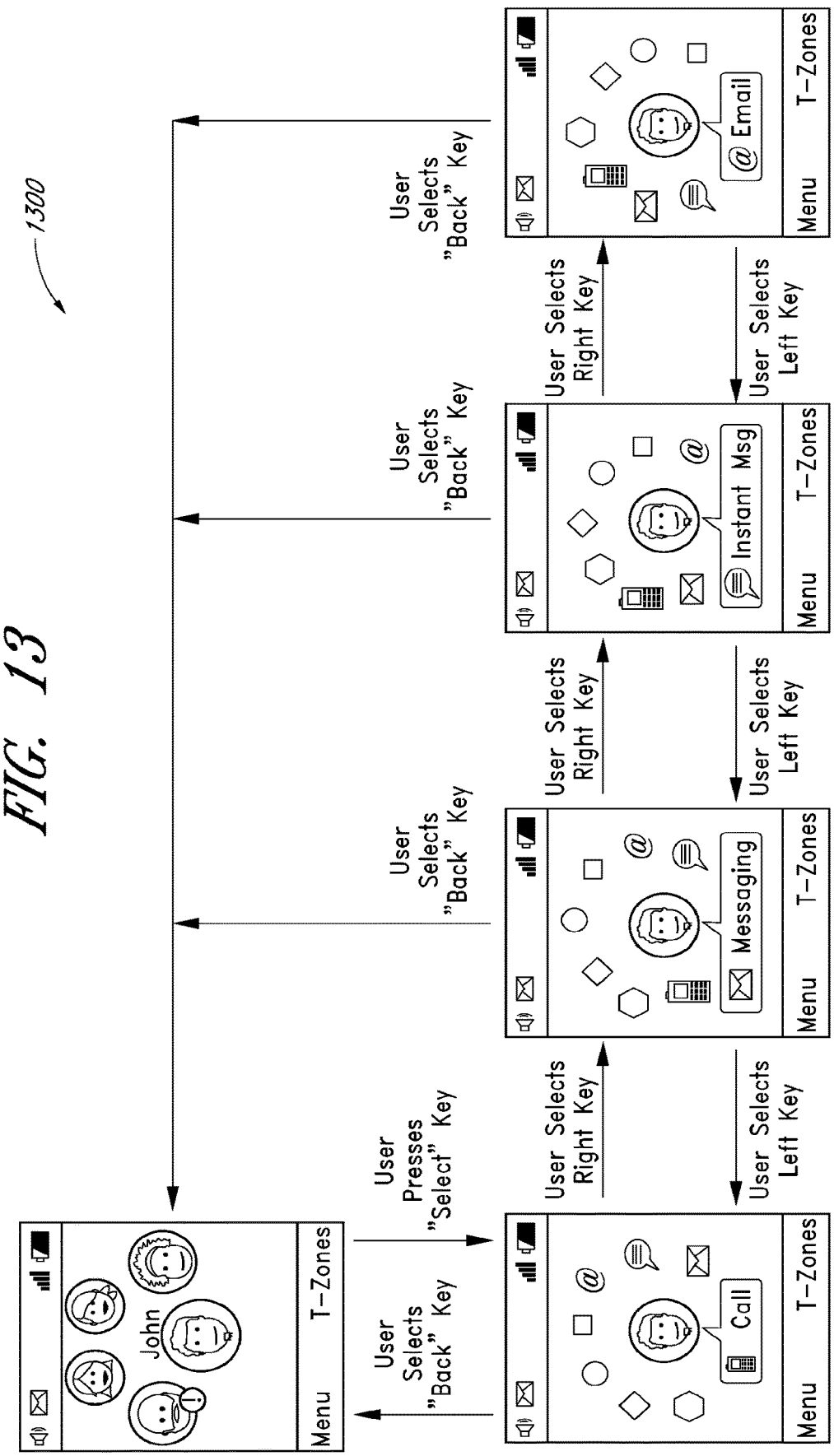
FIG. 13 is an illustration of another example user interface interaction sequence that illustrates selection of various communication modes associated with a contact.

FIG. 13 is an illustration of another example user interface interaction sequence (1300) that illustrates selection of various communication modes associated with a preferred contact. As illustrated in the figure, a preferred contact is initially selected from the idle screen by activating the "Select" key for the currently selected contact. The interaction activates the communication options menu, which includes a set of choices such as "Call", "Messaging", "Instant Messaging", "Email", etc., similar to that described previously for FIG. 2.

An arrangement of graphical icons is used to indicate each of the communication modes that is available for the currently selected contact. The graphical icons are arranged about a central axis relative to the display screen. The user interface in this example is arranged such that selection of the left and right navigation keys will result in rotationally changing the location of each of the graphical icons relative to the central axis. The currently selected communication mode in this example corresponds to the graphical icon that is located in the bottom center location of the display screen. The currently selected graphical icon also includes a text string that is displayed in the bottom center area of the display screen. A selection indicator in this example is illustrated by the box that surrounds the graphical icon and the associated text string.

As may be desired in any interface, the "Back" key feature can permit the user to dismiss the communication options menu and return to a prior screen such as the idle display screen. Similar to that discussed previously, the preferred contact group centric interface automatically retrieves addressing information for any of the selected communication modes such that activation of a communication mode only requires a single click.

Although the above-described example communication options menu is arranged in a circular or elliptical arrangement that rotates about a central axis on the screen, other arrangements are also available such as a linear list, a vertical list, a horizontal list, a diagonal list, a circular shape, a semi-circular shape, an elliptical shape, a triangular shape, a diamond shape, a U-shape, an L-shape, a square shape, a quadrilateral shape, a pentagonal shape, a hexagonal shape, another geometric patterned shape, a two-dimensional pattern, and a three-dimensional pattern.

While the above description of the communication options menu is described with a rotation about the central axis, graphical effects can also be used such as an animation effect, a highlight effect, a fade-in effect, a fade-out effect, a fly-in effect, a fly-out effect, a dissolve-in effect, a dissolve-out effect, a spiral-in effect, a spiral-out effect, a slide-in effect, and a slide-out effect.

The above-described example is illustrated where the bottom center location of the display screen corresponds to the currently selected communication mode. The present disclosure it not so limited, and any other screen location may also be utilized for the currently selected communication mode. Moreover, the graphical icons can remain stationary in another example, where a graphical indicator of the currently selected communication mode moves about the screen. The graphical indicator can be any desired effect such as a highlight effect, a selection box, an inverse video effect, etc.

Figure 14:
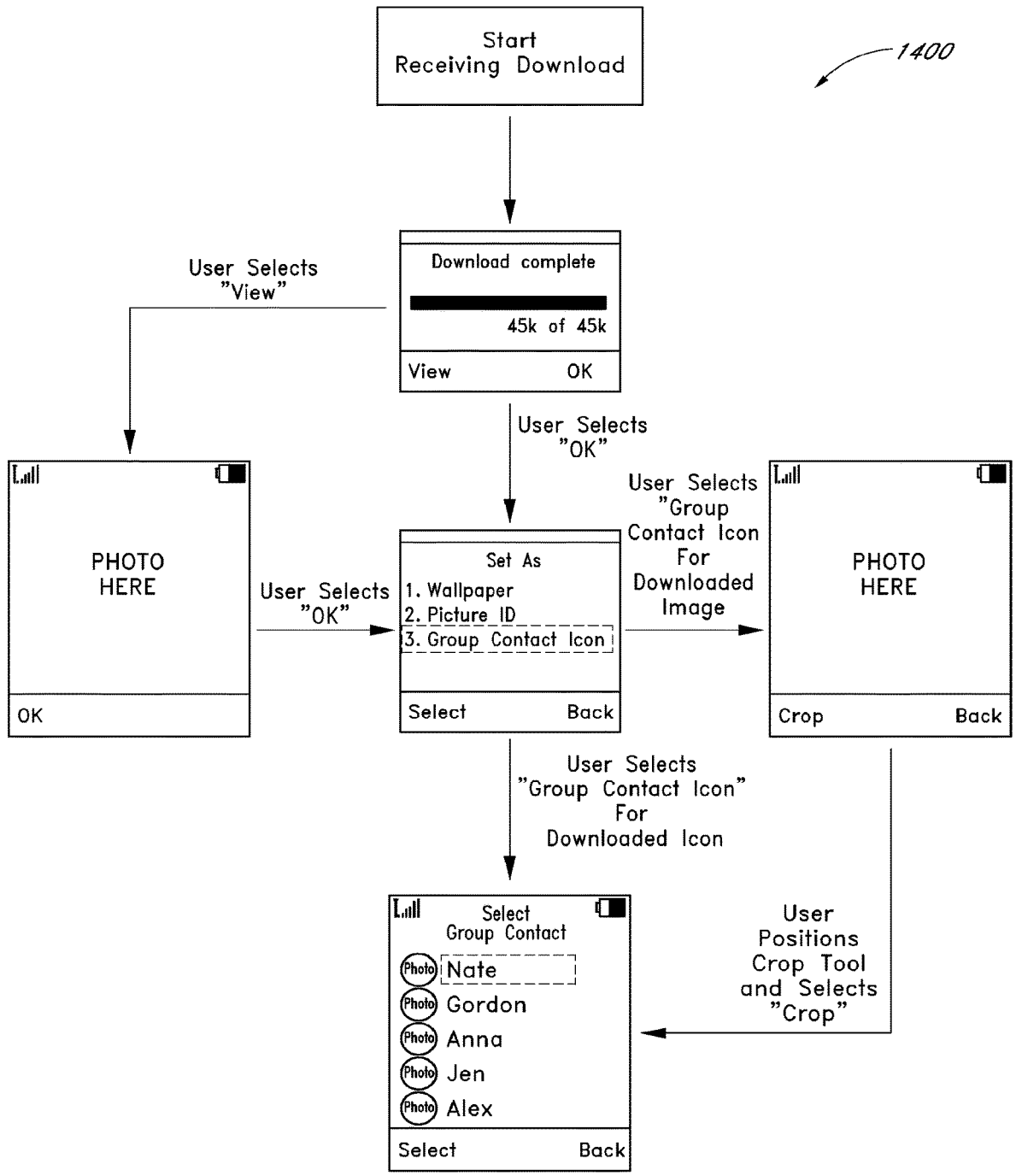
FIG. 14 is an illustration of a user interface interaction sequence for creation of a graphical icon for a preferred contact from a downloaded picture.

FIG. 14 is an illustration of a preferred contact group centric interface interaction sequence (1400) for creation of a graphical icon for a preferred contact from a downloaded picture. Interaction begins when "download picture" is activated from another menu such as from FIG. 7, or by some other interaction such as an Internet based download. After the picture is downloaded, a dialog screen is displayed indicating the download is complete. The dialog can be dismissed by selecting "OK" or the downloaded picture can be displayed by selecting "View". Once the dialog is dismissed or the photo is dismissed similarly with "OK", a "Set As" menu is displayed.

The "Set As" menu has a number of available selections such as "1. Wallpaper", "2. Picture ID", and "3. Group Contact Icon". Selection of "Wallpaper" saves the downloaded image as background wallpaper for the communication device. Selection of "Picture ID" saves the downloaded image as a photographic identifier, such as might be used by a contact manager application or perhaps stored in a file folder for other uses.

Selection of "Group Contact Icon" saves the downloaded image as a preferred contact icon. In some instances, the downloaded picture is not already in appropriate format and the image is cropped with a cropping tool similar to that previously described for FIG. 7. In other instances, the downloaded picture is already cropped and formatted as a preferred contact icon, and no further cropping and/or formatting is required. A menu is then displayed to assign the formatted icon to one of the contacts in the user's preferred contact group.

Figure 15:
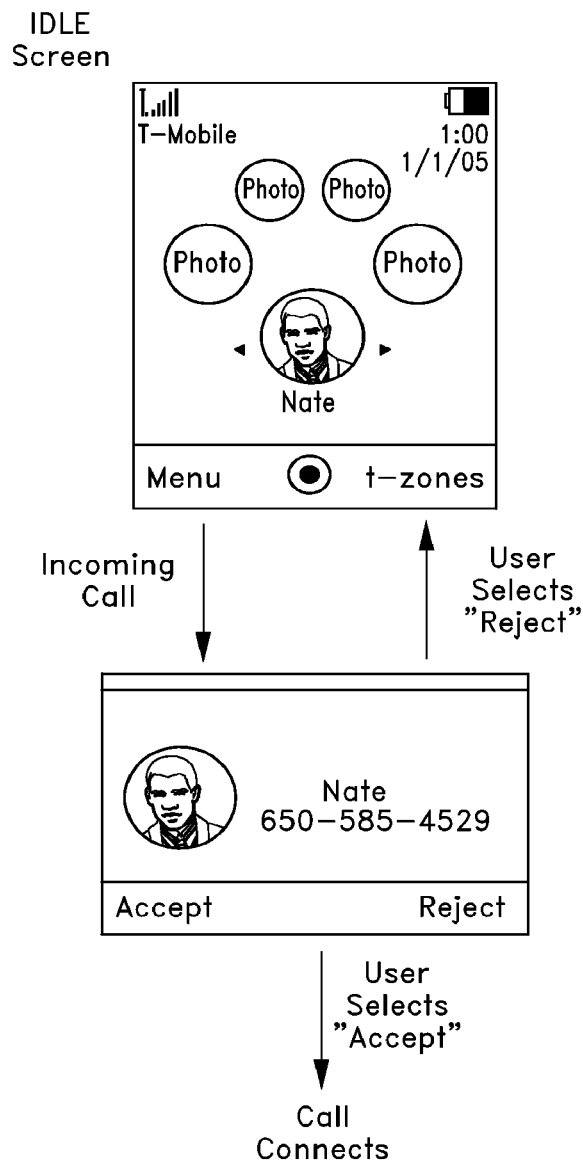
FIG. 15 is an illustration of an example user interface interaction sequence for an incoming communication notification associated with a contact.

FIG. 15 is an illustration of an example user interface interaction sequence (1500) for an incoming communication notification associated with a contact. The interaction begins from any appropriate screen such as an IDLE screen. When the incoming call is detected, the display screen on the communication device displays indicators for the incoming call such as the telephone number identified by caller ID, the group contact name associated with the incoming call, and a graphical identifier associated with the contact. The user can the select "accept" or "reject" for the incoming call as illustrated.

FIGS. 16A-16E are illustrations of an example web-based user interface for configuration and management of a preferred contact group user interface. As illustrated in FIG. 16A, a user can navigate a web page to select a preferred contacts group plan from the service provider, learn more about the plan, or view a demonstration of the preferred contacts group user interface. Once the group contact plan has been selected, a user can select management of group contacts through a web page as illustrated by FIG. 16B.

Figure 16D:
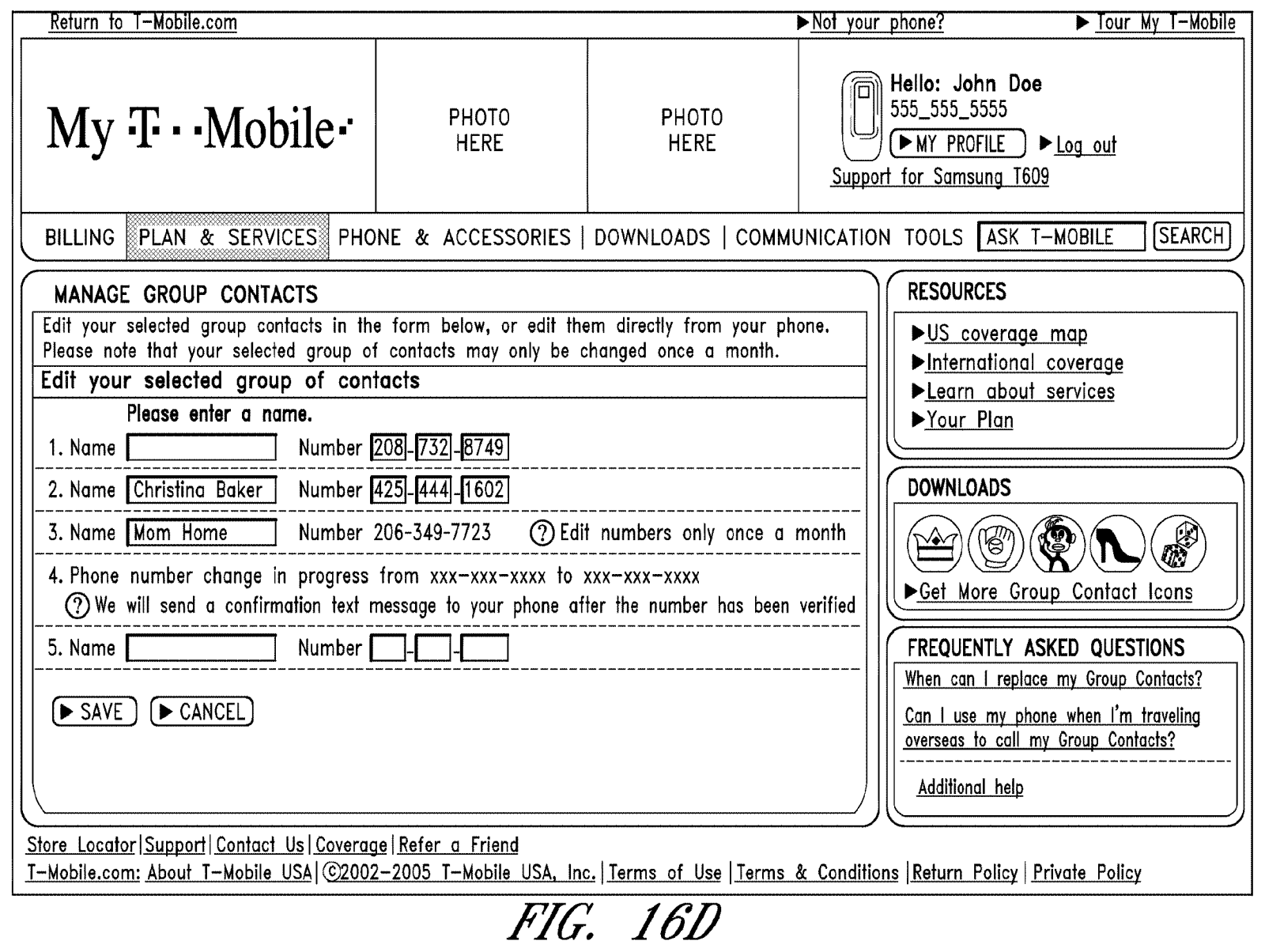
Figure 16E:
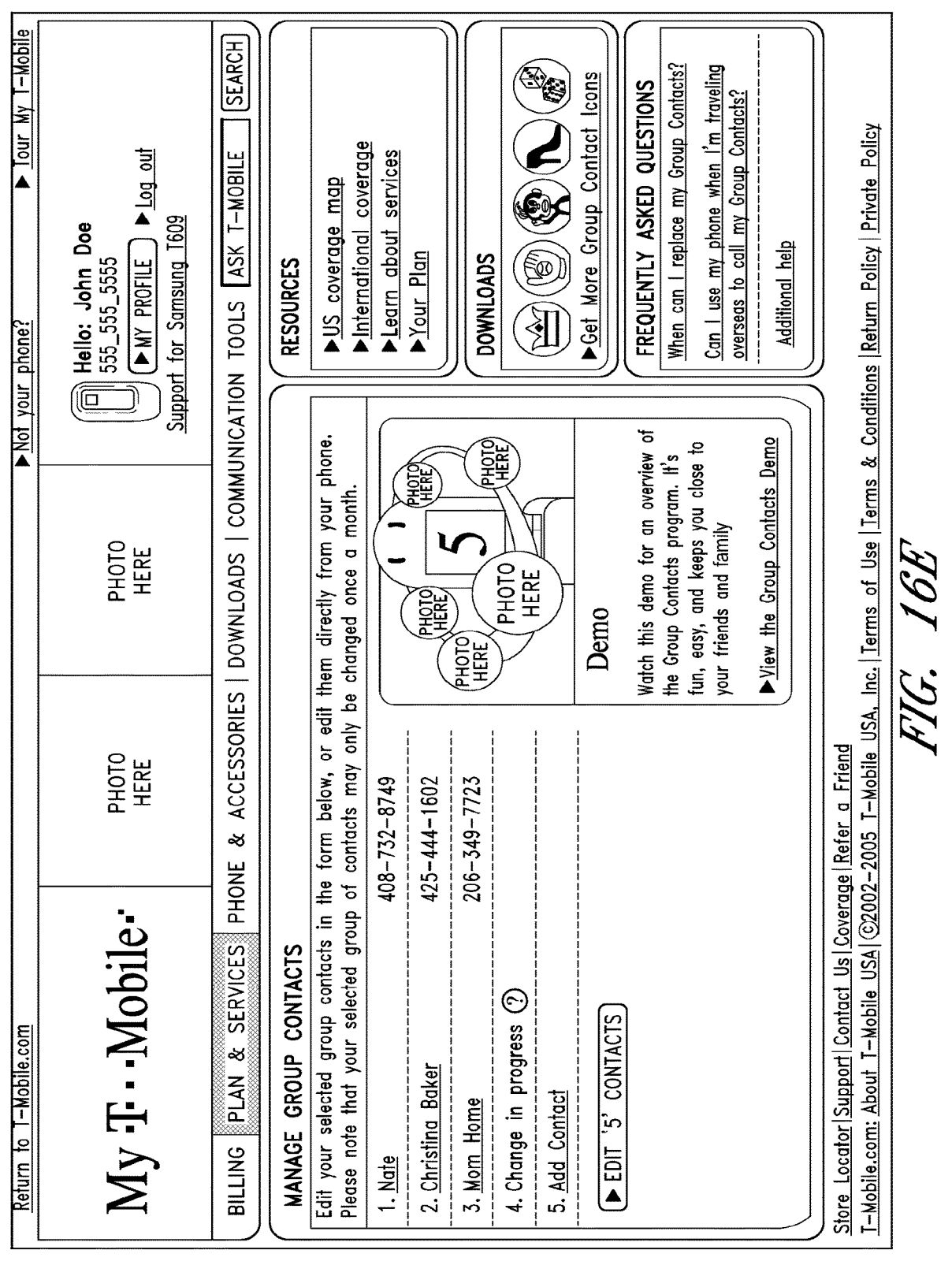

Selection of "manage group contacts" can be handled by a web-interface such as illustrated in FIG. 16C. Each contact has a designated name and phone number that can be added to the group as illustrated. An attempt to change a contact at a non-permitted time can result in a notification message such as illustrated in FIG. 16C, where group contacts can only be changed once a month. Failure to enter a name, or a duplicate name can result in a notification message to "please enter a name" as illustrated in FIG. 16D. FIG. 16E illustrates another contact management screen for managing group contacts, where web-links are used to edit all contacts, add a new contact, or select an existing contact for further editing.

Figure 17A:
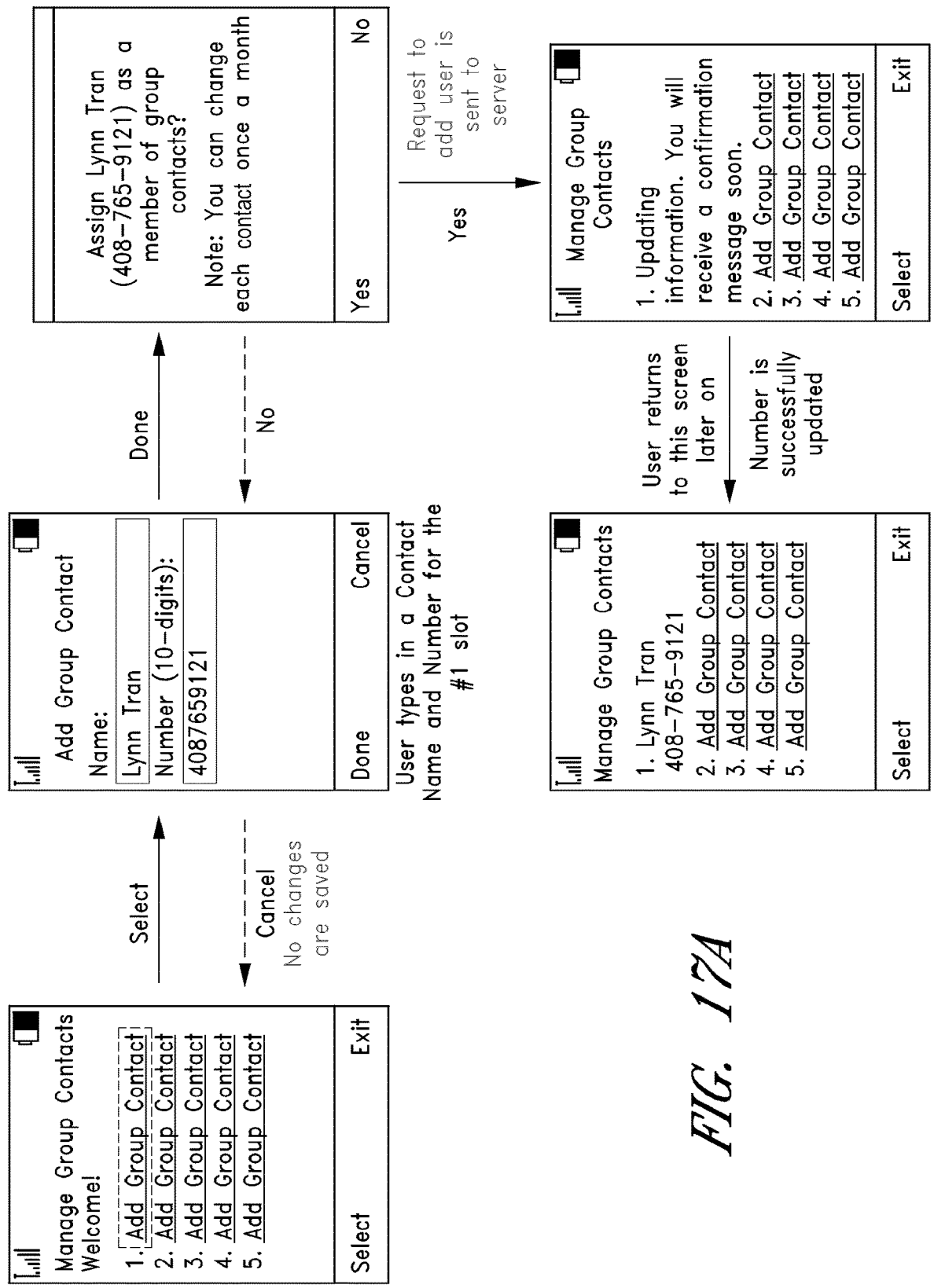
FIGS. 17A-17C are illustrations of an example WAP-based user interface for configuration and management of a preferred contact group user interface.
Figure 17B:
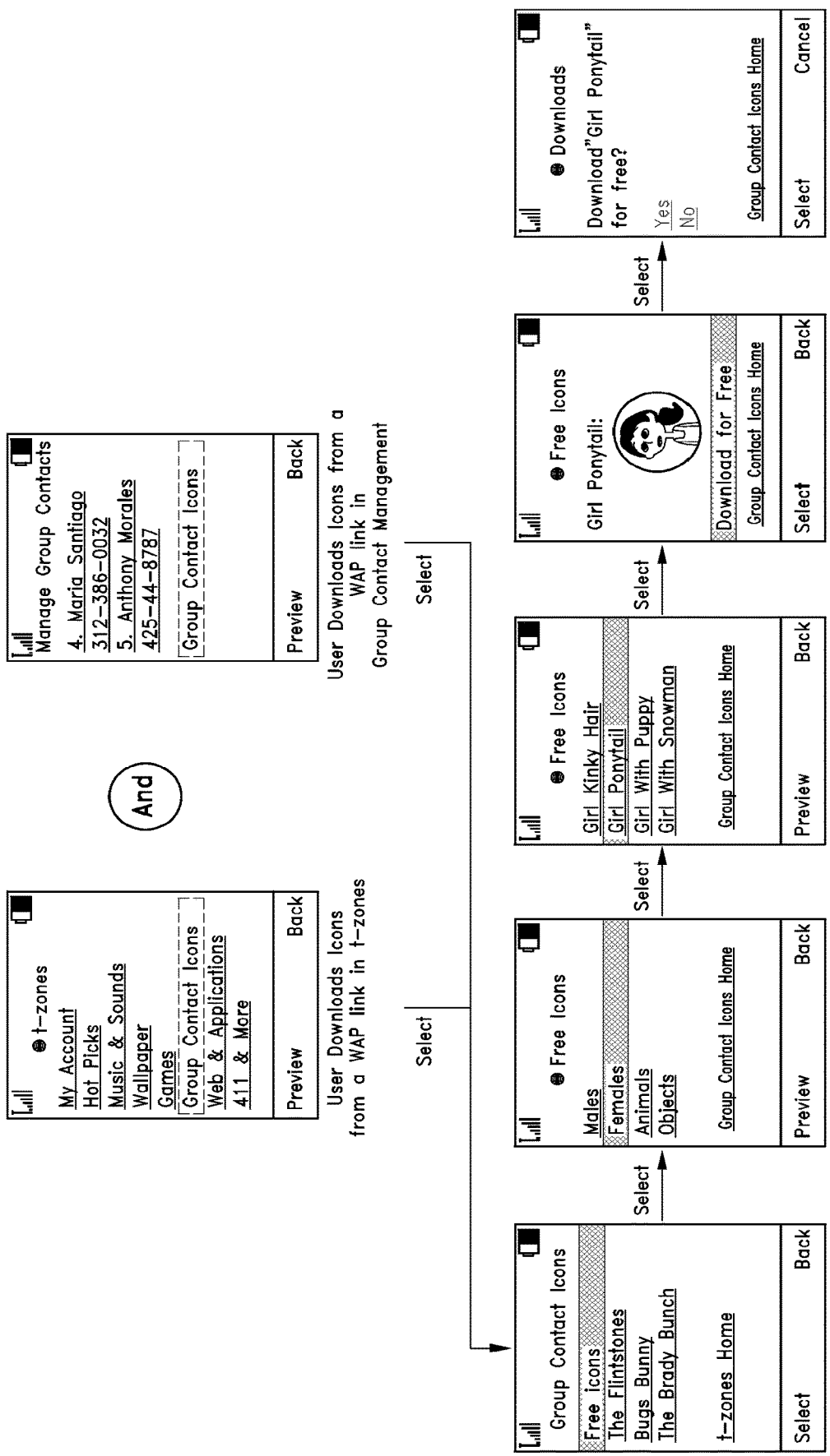
Figure 17C:
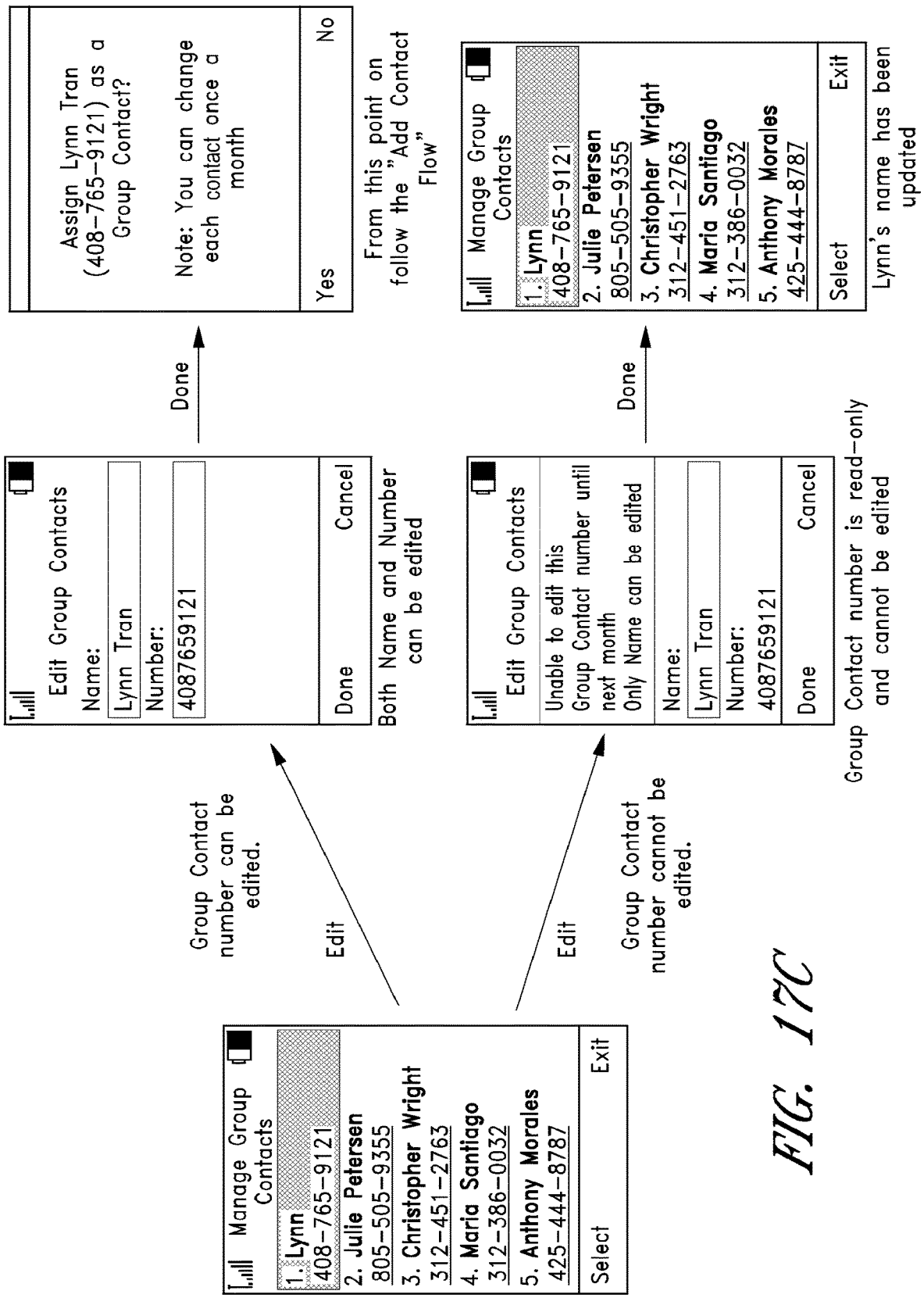

FIGS. 17A-17C are illustrations of an example WAP-based user interface for configuration and management of a preferred contact group user interface.

Initial configuration is illustrated in FIG. 17A, where a manage group contacts welcome screen is initially displayed prior to a user adding any contacts to the preferred contact group. A WAP link is displayed for adding each of the group contact members. A group contact member (e.g., contact slot #1) is selected using navigation keys. Once the desired group contact member is highlighted (e.g., see the dotted box), the user can choose "Select" to traverse to the WAP link for adding a group contact member. A new display screen is then presented where the user can enter a name and telephone number for the selected contact (e.g., contact slot #1), or select "Cancel" Once the user chooses "Done" a confirmation screen can be displayed to permit the user a last chance to confirm the changes to the selected group contact member (e.g. slot #1). The manage group contact screen displays an update notification for the selected contact member slot until the carrier network confirms the updated contact.

FIG. 17B illustrates an example of user management of icons for group contacts from a WAP-based interface. A user selects to download group contact icons from the WAP-based interface by selecting an appropriate navigation link that can be designated on a WAP page provided by the communications carrier. Alternatively, the user can select a WAP link to download an icon from a WAP based "Manage Group Contacts" web page. Icons can be provided for a service charge or for free as illustrated in the figures. Once downloaded, an icon is available for assignment to any of the preferred group contacts as previously described.

FIG. 17C illustrates an example of user based editing of group contact icons from a WAP-based interface. A user selects a group contact member from a WAP-link on the "Manage Group Contacts" WAP-based web page using a variety of navigation and selection methods previously described. By selecting the appropriate web-link, the user navigates to an "Edit Group Contact" WAP-based web page. The selected group contact slot may have already been changed once within the prescribed period (e.g., once per month), in which case the user will be able to change the name associated with the contact but not the associated phone number. When the user has not changed to phone number within the prescribed period, the user will be able to update both the phone number and the name associated with the selected contact. Once the user selects "Done" from the web page, the information is updated accordingly on the carrier network as previously described.

The above specification, examples and data provide a complete description of the manufacture and use of the composition of the embodiments. Although the subject matter has been described in language specific to structural features and/or methods, it is to be understood that the subject matter defined in the appended claims is not necessarily limited to the specific features, or specific implementations described above. Many other configurations of computing devices, communications features, applications, and distributed software and/or hardware systems may be employed to implement the described dynamic user interface. The specific features and methods described above are thus disclosed as example forms of implementing the claims and embodiments.

What is claimed is:

1. A computer-implemented method comprising:
   identifying a subset of contacts selected at least in part by a user of a communications device, wherein the subset of user contacts includes a portion of a set of contacts accessible by the communications device and wherein the subset of contacts includes a plurality of contacts;
   identifying a first mood indicator associated with a first contact from the subset of contacts, wherein the mood indicator is determined and dynamically updated based on a frequency of communication between the user and the first contact and first presence data that is provided by the first contact, wherein the first presence data comprises an availability status of the first contact;
   identifying a second mood indicator associated with a second contact from the subset of contacts, wherein the mood indicator is determined and dynamically updated based on a frequency of communication between the user and the second contact and second presence data that is provided by the second contact, wherein the second presence data comprises an availability status of the second contact; and
   causing the generation of a display on the communications device without requiring user input;
   wherein the display includes a graphical identifier corresponding to the first contact from the subset and a graphical identifier corresponding to the second contact from the subset, and
   wherein the display further includes the first mood indicator positioned adjacent to the graphical identifier associated with the first contact and a second mood indicator positioned adjacent to the graphical identifier associated with the second contact.

2. The method as recited in claim 1, wherein each contact in the subset of contacts is selected by the user of the communications device.

3. The method as recited in claim 1, wherein the display includes an arrangement of each of the graphical identifiers corresponding to a user contact from the subset.

4. The method as recited in claim 1, wherein the graphical identifiers associated with the subset of contacts are caused to be presented on the display in one of a home page screen and an idle screen.

5. The method as recited in claim 1, wherein the graphical identifiers associated with the subset of contacts are caused to be presented on the display in response to initiation of an idle screen state.

6. The method as recited in claim 1 further comprising:
   identifying a third mood indicator associated with a third contact from the subset of contacts.

7. The method as recited in claim 6, wherein the display further includes the third mood indicator positioned adjacent to the graphical identifier associated with the third contact.

8. A system comprising:
   a memory for maintaining a subset of contacts selected at least in part by a user of a communications device, wherein the subset of user contacts includes a portion of a set of contacts accessible by the communications device and wherein the subset of contacts includes a plurality of contacts; and
   a user interface component, in communication with the memory and implemented by executing instructions on a processor, the user interface component operative to:
      cause the generation of a first display on the communications device without initiating a user contact application for accessing the set of contacts accessible by the communications device, wherein the first display includes a graphical identifier associated with each contact of the subset of contacts;
      identify a first mood indicator associated with a first contact from the subset of contacts, wherein the mood indicator is determined and dynamically updated based on a frequency of communication between the user and the first contact and first presence data that is provided by the first contact, wherein the first presence data comprises a location status of the first contact;
      identify a second mood indicator associated with a second contact from the subset of contacts, wherein the mood indicator is determined and dynamically updated based on a frequency of communication between the user and the second contact and second presence data that is provided by the second contact, wherein the second presence data comprises a location status of the second contact; and
      cause the generation of an updated display on the communications device without requiring user input;
      wherein the updated display includes a graphical identifier corresponding to the first contact from the subset and a graphical identifier corresponding to the second contact from the subset, and wherein the updated display further includes the first mood indicator positioned adjacent to the graphical identifier associated with the first contact and a second mood indicator positioned adjacent to the graphical identifier associated with the second contact.

9. The system as recited in claim 8, wherein each contact in the subset of contacts is selected by the user of the communications device.

10. The system as recited in claim 8, wherein the first display and the updated display includes an arrangement of each of the graphical identifiers corresponding to a user contact from the subset.

11. The system as recited in claim 8, wherein the graphical identifiers associated with the subset of contacts are caused to be presented on the display in one of a home page screen and an idle screen.

12. The system as recited in claim 8, wherein the graphical identifiers associated with the subset of contacts are caused to be presented on the display in response to initiation of an idle screen state.

13. The system as recited in claim 8, wherein the user interface component is further operative to identify a third mood indicator associated with a third contact from the subset of contacts.

14. The system as recited in claim 13, wherein the updated display further includes the third mood indicator positioned adjacent to the graphical identifier associated with the third contact.

* * * * *